United States Patent
Yokoyama

(10) Patent No.: US 6,963,610 B2
(45) Date of Patent: Nov. 8, 2005

(54) MOVING IMAGE CODING DEVICE, MOVING IMAGE CODING METHOD AND PROGRAM THEREOF EMPLOYING PRE-ANALYSIS

(75) Inventor: Yutaka Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 570 days.

(21) Appl. No.: 10/058,298

(22) Filed: Jan. 30, 2002

(65) Prior Publication Data

US 2002/0131492 A1 Sep. 19, 2002

(30) Foreign Application Priority Data

Jan. 31, 2001 (JP) ........................................ 2001-024322

(51) Int. Cl.[7] .............................................. H04N 7/12
(52) U.S. Cl. ................................................ 375/240.12
(58) Field of Search ...................... 375/240.02–240.07, 375/240.12–240.16, 240, 240.21, 240.24; 382/239, 240; H04N 7/12

(56) References Cited

U.S. PATENT DOCUMENTS

| | | | | |
|---|---|---|---|---|
| 6,148,107 A | * | 11/2000 | Ducloux et al. | ....... 375/240.03 |
| 6,151,360 A | * | 11/2000 | Kato et al. | ............. 375/240.03 |
| 6,167,084 A | * | 12/2000 | Wang et al. | ............ 375/240.02 |
| 6,192,075 B1 | * | 2/2001 | Jeng et al. | ................... 375/240 |
| 6,226,326 B1 | * | 5/2001 | Mihara | ................... 375/240.05 |
| 6,229,925 B1 | * | 5/2001 | Alexandre et al. | .......... 382/239 |
| 6,522,693 B1 | * | 2/2003 | Lu et al. | ................. 375/240.02 |
| 6,600,783 B1 | * | 7/2003 | Morita et al. | .......... 375/240.03 |
| 6,625,322 B1 | * | 9/2003 | Kondo et al. | ................ 382/239 |

FOREIGN PATENT DOCUMENTS

JP      10-66067      3/1998

* cited by examiner

Primary Examiner—Richard Lee
(74) Attorney, Agent, or Firm—Foley & Lardner LLP

(57) ABSTRACT

A method of making coding images with a two-pass encode or a pre-analysis, wherein the control quantity is suitably given to a buffer. An image coding device makes compresses and codes moving images, and has a pre-analyzing unit, which exist in a constant interval, for making a coding for the images that were input to observe characteristics of each image. Based on the observed characteristics, a unit estimates the complexity degrees of the images and based on the estimated complexity degrees, allocates a code quantity to the images in a constant interval to compute a target code quantity of each image. The device calculates a transition of occupancy in a buffer in assigning the computed target code quantity to each of the images to regulate the target code quantity so that the buffer does not give rise to an overflow or an underflow.

42 Claims, 23 Drawing Sheets

MOVING IMAGE CODING DEVICE, MOVING IMAGE CODING METHOD AND PROGRAM THEREOF EMPLOYING PRE-ANALYSIS

BACKGROUND OF THE INVENTION

The present invention relates to a moving image coding device that analyzes images, which were input, prior to coding of the images that were input to take a coding control based on this analysis result, a moving image coding method, and a program thereof, and more particular to a moving image coding device that smoothes fluctuating generation code quantity by a coding buffer under a fixed bit rate, and outputs coding data at a fixed rate, a moving image coding method, and a program thereof.

As a coding method employing a pre-analysis, is known the method disclosed in J-P-66067/1998.

In said method, prior to making a coding for the images, analysis was made for the images that were input beforehand, and, after a complexity degree of each image was computed, target code quantity was calculated according to a ratio of complexity of said image to a total complexity degree.

A configuration of the moving image coding device will be explained.

FIG. 25 is a diagram illustrating a configuration of the moving image coding device employing the pre-analysis.

As shown in FIG. 25, the moving image coding device is configured of pre-analysis means 901, target code quantity computation means 1010, quantization controlling means 1001, moving image coding means 1002, and delay means 902.

The pre-analysis means 901 is means for measuring the complexity degree of each image with pre-encoding or extraction of statistics.

According to a ratio of the complexity of the above image to the degree indicating the total complexity of a certain constant interval analyzed in the pre-analysis means 901, the target code quantity computation means 1010 calculates the target code quantity of the images, by assigning to the above image a constant ratio of the code quantity that can be assigned to all images of a certain constant interval.

The delay means 902 is means for delaying supply of said input images to main coding means 1000 until the target code quantity of the above image is determined.

The quantization controlling means 1001 is means for computing a quantization scale from the assigned code quantity.

The moving image coding means 1002 is means for coding the images so that the code quantity, which is generated as a result of having coded the images that were delayed by the delay means 902, becomes the target code quantity calculated in the target code quantity computation means 1010.

Next, an operation of the above-mentioned configuration will be explained.

FIG. 26 is a diagram illustrating an operation of the moving image coding device employing the pre-analysis.

As shown in FIG. 26, when an image j is coded, the images of L frames are pre-analyzed with the pre-analysis means 901 to compute a complexity degree of each image, based on this analysis result. And, the target code quantity computation means 1010 calculates the target code quantity of only the image j, based on the complexity degrees computed in the pre-analysis means 901. The moving image coding means 1002 codes the image j so that the code quantity becomes the target code quantity calculated in the target code quantity computation means 1010. In such a manner, the art is generally known of assigning the code quantity much more to the images that need the code quantity than to the images that do not need the code quantity too much, by making an analysis for the images prior to making a coding for the images to allocate the code quantity to the images according to the complexity degree obtained by this analysis result.

But, no consideration was given to a transition of buffer occupancy brought by the assignment of the code quantity, whereby the defects existed: In performing the actual coding process, failures of the buffer such as an overflow or an underflow were brought about in the buffer. Even if the process for avoiding the failures of the buffer was built-in in performing the actual coding process, the code quantity, which is generated in coding the images, results in having deviated from the assigned target code quantity, and the code quantity control after generation comes to be not able to be taken exactly.

Further, in the event that the process for avoiding the failures of the buffer was performed, the different code quantity from the code quantity, which was originally to be assigned, resulted in being assigned and the defect existed that deterioration in coded images was brought about.

SUMMARY OF THE INVENTION

The present invention has been accomplished so as to settle the above-mentioned tasks, and the task that the preset invention intends to solve is to provide the art of being able to improve image quality of the coded images by making analysis for the images prior to coding the input images to compute the complexity degree of each image, to assign the code quantity that corresponded to this complexity degree to the images within a constant interval, to avoid the failures of the buffer by estimating a transition of occupancy at which the code quantity occupies the buffer, and to make suitable code allocation, based on the bit rate and a buffer size that were given.

Said task is solved by the moving image coding device that makes a compression and coding for the moving images, said image coding device characterized by including: means for analyzing the images, which exist in a constant interval, to observe characteristics of each image; based on said observed characteristics, means for estimating the complexity degrees of said images; means for pre-allocating the code quantity to said constant interval, and computing target code quantity with which said allocated code quantity is assigned to each image of all images within the constant interval based on said estimated complexity degrees; a buffer which is accumulating codes that are generated as a result of having coded the images; when said computed target code quantity is assigned to each of said images, means for calculating a transition of the occupancy in said buffer of said code to regulate the target code quantity so that said buffer does not give rise to an overflow or an underflow; and means for making a compression and coding for said images according to said regulated target code quantity.

This configuration can allocate the code quantity, which corresponded to the estimated complexity degrees, and thus the code quantity can be assigned much more to the images that need the code quantity than to the images that do not need the code quantity too much, whereby deterioration of image quality caused by a factor that the codes were not sufficiently assigned can be alleviated. Also, a difference between the generation code quantity and the target code quantity, which is brought by avoiding the overflow or the underflow, can be reduced, and it becomes possible to take the control of the code quantity suitably.

Said task is solved by the moving image coding device that makes a compression and coding for the moving images, said image coding device characterized by including: means for analyzing the images, which exist in a first constant interval, to observe characteristics of each image; based on said observed characteristics, means for estimating the complexity degrees of said images; means for predicting the complexity degrees of the images that exist in a second constant interval that succeeds said first constant interval; means for allocating the code quantity to a combined interval in which said first constant interval and said second constant interval were combined, based on said estimated complexity degrees and said predicted complexity degrees, to compute the target code quantity with which said allocated code quantity is assigned to each image of all images within said combined interval; a buffer which is accumulating codes that are generated as a result of having coded the images; when said calculated target code quantity is assigned to each of said images, means for calculating a transition of the occupancy in said buffer of said code to regulate the target code quantity so that said buffer does not give rise to an overflow or an underflow; and means for making a compression and coding for said images according to said regulated target code quantity.

Also in the event that a period during which analysis can be made does not reach a period during which the utilizable code quantity is deemed to be constant (for example, a GOP in MPEG), this configuration allows the assignment of the code quantity to be executed for the period during which the utilizable code quantity is deemed to be constant, and the code quantity allocation, which is not influenced by a fluctuation of the generation code quantity due to a difference of the code method of each image (difference of a picture type), can be realized.

In particular, said means for estimating the complexity degrees of the images is characterized by being configured so as to estimate the complexity degrees of the images, based on the statistics of the analyzed images.

Also, said means for predicting the complexity degrees of the images is characterized by being configured so as to predict the complexity degrees of the images, based on the complexity degrees of the images that were already analyzed.

Also, said means for observing the characteristics is characterized by being configured so that, in coding the images, which were input, with a pre-determined method, are observed the code quantity, which is generated by coding of the images, or said generated code quantity, and the value of the quantization scales used.

This configuration improves a precision of estimating the complexity degrees from the characteristics of the images, and the code quantity allocation, which corresponded to the characteristics of the images, can be made suitably.

Also, said means for observing the characteristics is characterized by being configured so that, in the event of making an intra-frame coding for the images that were input, a correlation is observed between neighboring pixels within a frame of said images, and in the event of making an inter-frame predictive coding for the images that were input, the intra-frame prediction error quantity of said images that were input is observed.

This configuration makes it unnecessary to execute the complete coding process in the pre-analysis. Also, it is known that a correlation exists between the complexity degree of the image for which the intra-frame coding was made and a correlation between neighboring pixels within a frame, and it is possible to estimate the complexity degrees, employing a correlation between neighboring pixels within a frame. Further, it is known that a correlation exists between the complexity degree of the images for which the inter-frame predictive coding was made and the inter-frame prediction error, and it is possible to estimate the complexity degrees, employing the inter-frame prediction error. Therefore, by utilizing these kinds of characteristics to estimate the complexity degrees, performance equivalent to the event of employing the complexity degrees can be obtained with less operational quantity.

Also, said moving image coding device includes means for reducing the image sizes that were input, and said means for observing the complexity degrees is characterized by being configured so that, in the event of making an intra-frame coding for the images that were input, a correlation is observed between neighboring pixels within a frame of said images that were input, and in the event of making an inter-frame predictive coding for the images that were input, the inter-frame prediction error quantity of said reduced images is observed.

Also, said moving image coding device includes means for reducing the image sizes that were input, and said means for observing the complexity degrees is characterized by being configured so that, in the event of making an intra-frame coding for the images that were input, a correlation is observed between neighboring pixels within a frame of said reduced images, and in the event of making an inter-frame predictive coding for the images that were input, inter-frame prediction error quantity of said images that were input is observed.

Also, said moving image coding device includes means for reducing the image sizes that were input, and said means for observing the complexity degrees is characterized by being configured so that, in the event of making an intra-frame coding for the images that were input, a correlation is observed between neighboring pixels within a frame of said reduced images, and in the event of making an inter-frame predictive coding for the images that were input, the inter-frame prediction error quantity of said reduced images is observed.

This configuration reduces the number of pixels to be treated, and computing costs (the number of operators and computational complexity) can be curtailed.

Also, said means for observing the complexity degrees is characterized by being configured so as to predict the complexity degrees for each picture type.

This configuration gives the assignment the consideration of a difference of the generation code quantity between each picture type and the others.

Also, said constant interval is characterized by fixing the interval length of the GOP in coding the images input by the use of the image coding technique that is applied in MPEG1 or MPEG2, and being a multiple of N (Integer) of the interval length of the GOP.

Also, said combined interval is characterized by fixing the interval length of the GOP in coding the images input by the use of the image coding technique that is applied in MPEG1 or MPEG2, and being a multiple of N (Integer) of the interval length of the GOP.

This configuration can always use constant code quantity for assignment.

Said task is solved by the moving image coding method of making a compression and coding for the moving images, employing a device having a buffer for coding, said image coding method characterized by including: the steps of: analyzing the images, which exist in a constant interval, to observe characteristics of each image; based on said observed characteristics, estimating the complexity degrees of said images; pre-allocating the code quantity to said constant interval and computing the target code quantity with which said allocated code quantity is assigned to each image of all images within said constant interval based on said estimated complexity degrees; when said calculated target code quantity is assigned to each of said images, calculating a transition of the occupancy in said buffer of the code to regulate the target code quantity so that said buffer does not give rise to the overflow or the underflow; and making a compression and coding for said images according to said regulated target code quantity.

Said task is solved by the moving image coding method of making a compression and coding for the moving images, employing a device having a buffer for coding, said image coding method characterized by including the steps of: analyzing the images, which exist in a first predetermined interval, to observe characteristics of each image; based on said observed characteristics, estimating the complexity degrees of said images; predicting the complexity degrees of the images that exist in a second constant interval that succeeds said first constant interval; allocating the code quantity to a combined interval in which said first constant interval and said second constant interval were combined, based on said estimated complexity degrees and said predicted complexity degrees, to compute the target code quantity with which said allocated code quantity is assigned to each image of all images within said combined interval; when said calculated target code quantity is assigned to each of said images, calculating a transition of the occupancy in said buffer of the code to regulate the target code quantity so that said buffer does not give rise to the overflow or the underflow; and making a compression and coding for said images according to said regulated target code quantity.

In particular, said step of estimating the complexity degrees of said images is characterized in that the complexity degrees of the images are estimated, based on the statistics of the analyzed images.

Also, said step of predicting the complexity degrees of said images is characterized in that the complexity degrees of the images are predicted, based on the complexity degrees of the images that were already analyzed.

Also, said step of observing said characteristics is characterized in that the code quantity, which are generated by coding, or said generated code quantity, and the value of the quantization scale used are observed in coding the images, which were input, with a pre-determined coding method.

Also, said step of observing the characteristics is characterized in that: in the event of making an intra-frame coding for the images that were input, a correlation is observed between neighboring pixels within a frame of said images; and in the event of making an inter-frame predictive coding for the images that were input, the intra-frame prediction error quantity of said images that were input is observed.

Also, said moving image coding method further includes a step of reducing the size of the images that were input, and said step of observing the complexity degrees is characterized in that: in the event of making an intra-frame coding for the images that were input, a correlation is observed between neighboring pixels within a frame of said images that were input; and in the event of making an inter-frame predictive coding for the images that were input, the inter-frame prediction error quantity of said reduced images is observed.

Also, said moving image coding method further includes a step of reducing the size of the images that were input, and said step of observing the complexity degrees is characterized in that: in the event of making an intra-frame coding for the images that were input, a correlation is observed between neighboring pixels within a frame of said reduced images and in the event of making an inter-frame predictive coding for the images that were input, the inter-frame prediction error quantity of said images that were input is observed.

Also, said moving image coding method further includes a step of reducing the size of the images that were input, and said step of observing the complexity degrees is characterized in that: in the event of making an intra-frame coding for the images that were input, a correlation is observed between neighboring pixels within a frame of said reduced images; and in the event of making an inter-frame predictive coding for the images that were input, the inter-frame prediction error quantity of said images that were input is observed.

Also, said step of observing the complexity degrees is characterized in that the complexity degrees are predicted for each picture type.

Also, said constant interval is characterized by fixing the interval length of the GOP in coding the images input by the use of the image coding technique that is applied in MPEG1 or MPEG2, and being a multiple of N (Integer) of the interval length of the GOP.

Also, said combined interval is characterized by fixing the interval length of the GOP in coding the images input by the use of the image coding technique that is applied in the MPEG1 or the MPEG2, and being a multiple of N (Integer) of the interval length of the GOP.

Said task is solved with a program for causing an information processing device, which configures the moving image coding device that makes a compression and coding for the moving images, to execute the processes of: analyzing the images, which exist in a constant interval, to observe characteristics of each image; based on said observed characteristics, estimating the complexity degrees of said images; pre-allocating the code quantity to said constant interval, and computing the target code quantity with which said allocated code quantity is assigned to each image of all images within said constant interval based on said estimated complexity degrees; when said calculated target code quantity is assigned to each of said images, calculating a transition of the occupancy in the buffer of the code to regulate the target code quantity so that said buffer does not give rise to the overflow or the underflow; and making a compression and coding for said images according to said regulated target code quantity.

Said task is solved with a program for causing an information processing device, which configures the moving image coding device that makes a compression and coding for the moving images, to execute the processes of: analyzing the images, which exist in a first predetermined interval, to observe characteristics of each image; based on said observed characteristics, estimating the complexity degrees of said images; predicting the complexity degrees of the images that exist in a second constant interval that succeeds said first constant interval; allocating the code quantity to a combined interval in which said first constant interval and said second constant interval were combined, based on said estimated complexity degrees and said predicted complexity degrees, to compute the target code quantity with which said allocated code quantity is assigned to each image of all images within said combined interval; when said calculated target code quantity is assigned to each of said images, calculating a transition of the occupancy in said buffer of the code to regulate the target code quantity so that said buffer does not give rise to the overflow or the underflow; and making a compression and coding for said images according to said regulated target code quantity.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

A first embodiment of the present invention will be explained.

Additionally, in this embodiment, MPEG (Motion Picture Experts Group) 1 or MPEG 2 is presumed as a coding technique of the images, and the heart of the explanation is that the length of the interval in which the assignment of the code quantity is made is the GOP (Group Of Pictures) unit; however the GOP may not always be employed as unit.

Figure 1:
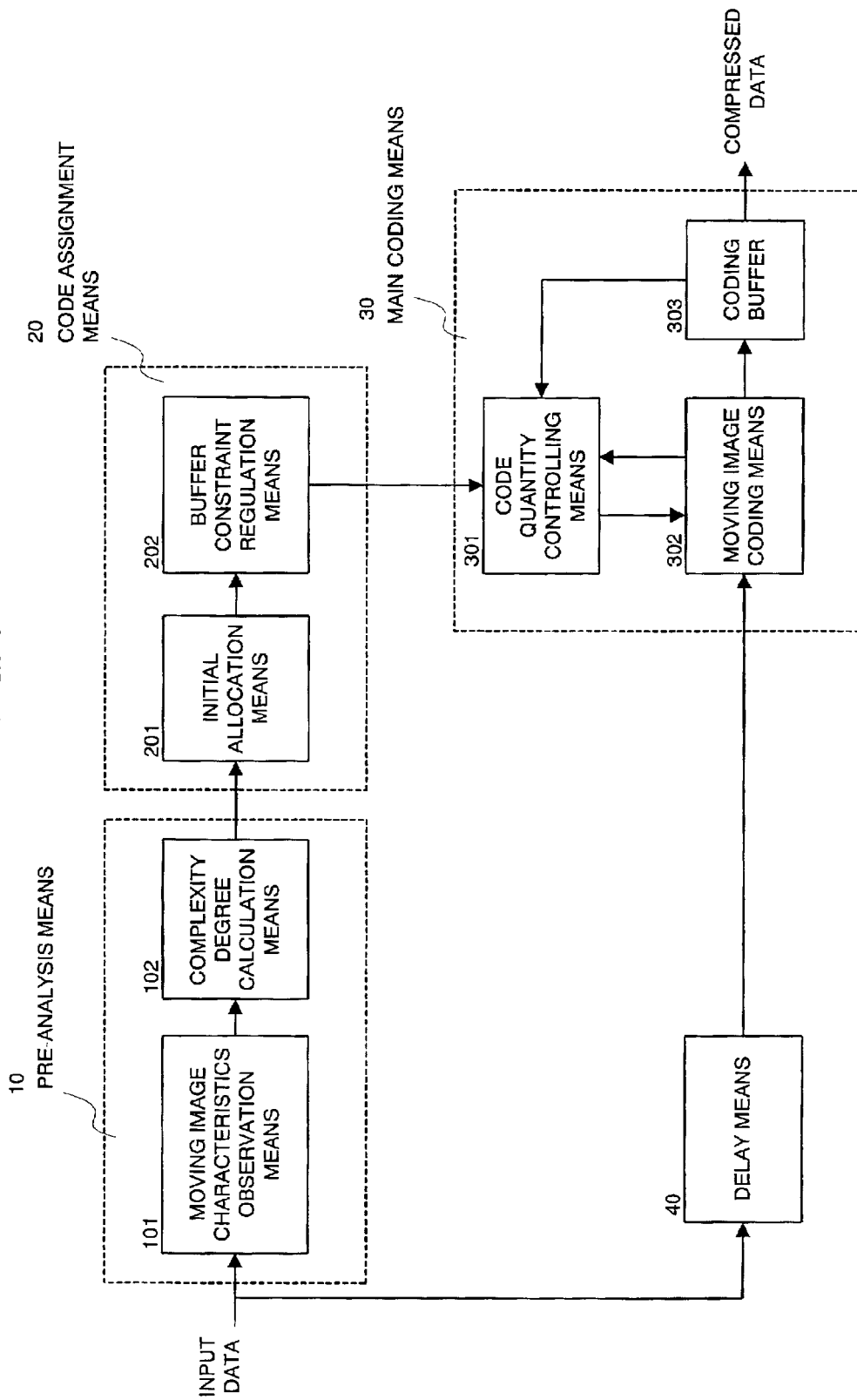
FIG. 1 is a block diagram of a moving image coding device.
Figure 2:
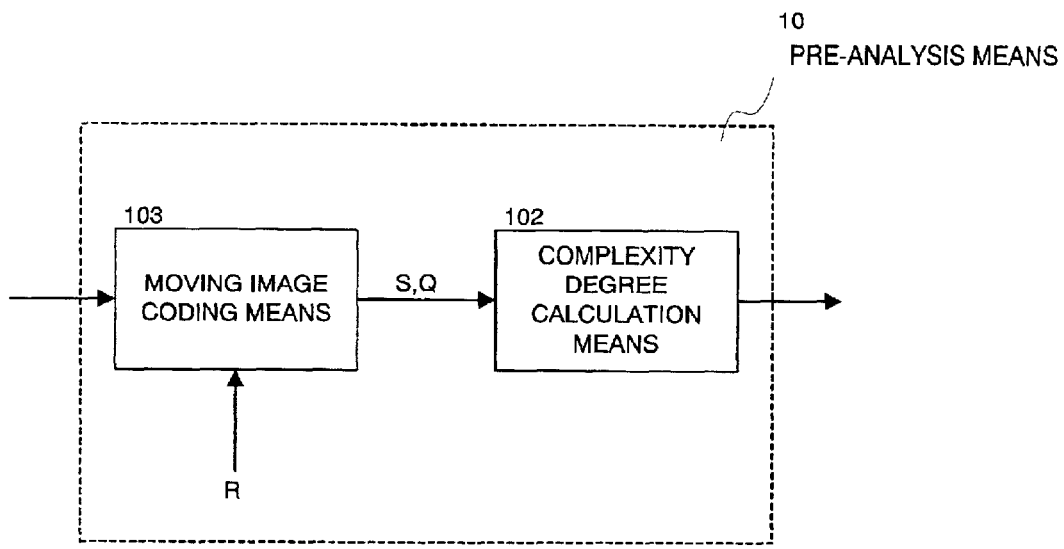
FIG. 2 is a block diagram of pre-analysis means 10.
Figure 3:
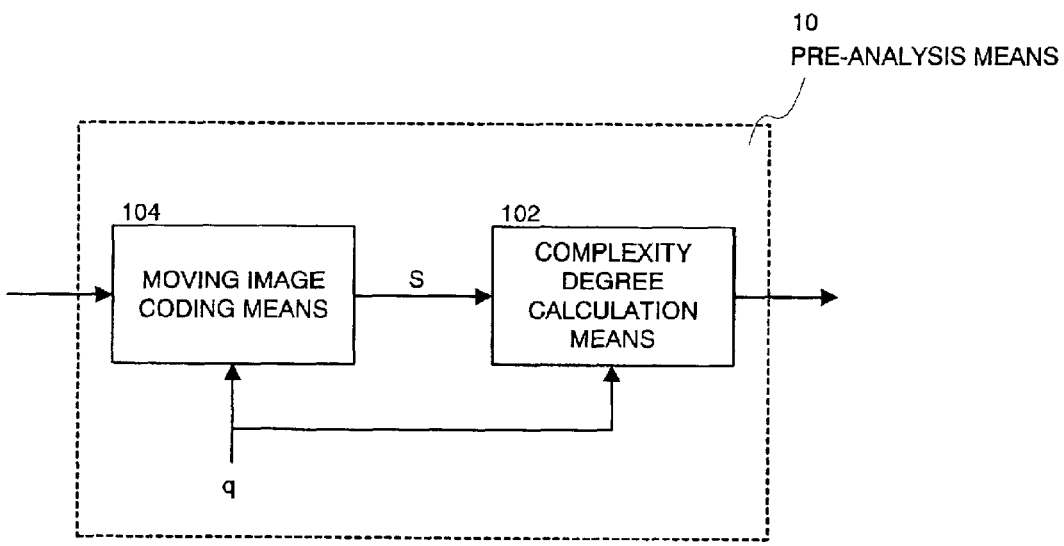
FIG. 3 is a block diagram of pre-analysis means 10.

FIG. 1 is a block diagram of the moving image coding device. FIG. 2 and FIG. 3 are block diagrams of the pre-analysis means. FIG. 4 is a view for explaining the overflow avoiding process. FIG. 5 is a view for explaining the underflow avoiding process.

The moving image coding device is configured of pre-analysis means 10, code assignment means 20, main coding means 30 and delay means 40 as shown in FIG. 1.

The pre-analysis means 10, which is configured of moving image characteristics observation means 101 and complexity degree calculation means 102, is means for analyzing a pattern and a situation of motion of the images that were input, generation code quantity at the moment of coding, and so forth to observe the characteristics of each image, and to calculate the complexity degrees from this characteristics.

Hereinafter, each element of the pre-analysis means 10 will be explained.

The moving image characteristics observation means 101 is means for observing the generation code quantity and average quantization scales of the images as the characteristics. For example, the moving image characteristics observation means 101 is configured of moving image coding means 103, as shown in FIG. 2. And, the moving image coding means 103, in which a code quantity controlling function is included, actually makes the coding for the frames to observe the generation code quantity S [j] and the average quantization scale Q [j] of the frame j, based on a designated bit rate R.

The complexity degree calculation means 102 is means for calculating the complexity degrees, based on the generation code quantity and the average quantization scale observed in the moving image coding means 103. For example, in the event that the generation code quantity was set at S [j], the average quantization scale at Q [j] and the complexity degree at X [j], the complexity degree X [j] is calculated as $$X[j]=S[j]*Q[j].$$

Additionally, as shown in FIG. 3, the moving image characteristics observation means 101 may be configured of moving image coding means 104 to make the coding for the images with a fixed quantization scale q, to observe the generation code quantity Sq [j] that is generated by this coding, and to set the complexity degree X [j] as $$X[j]=Sq[j]*q.$$

The code assignment means 20, which is configured of initial allocation means 201 and buffer constraint regulation means 202, is means for assigning the code quantity to the images in the constant interval in which the images that are to be coded next exist, based on analysis data analyzed in the pre-analysis means 10.

Hereinafter, each element of the code assignment means 20 will be explained.

The initial allocation means 201 is means for allocating the total code quantity, which can be used in the assignment interval of the code quantity, according to the complexity degree of each image. For example, in the event that the assignment interval of the code quantity was set at L frame, and total code quantity that can be assigned to the frames ranging from a j-th frame to a (j+L−1)-th frame at Ra[j], the target code quantity T[j] of each frame obtained by making proportional allocation for Ra[j] with the complexity degree X[j] is calculated as $$T[j]=X[j]/X\mathrm{sum}*Ra[j]$$

$$X sum = \sum_{k=j}^{j+L-1} X[k].$$

Additionally, $X_{sum}$ indicates summation of the complexity degrees in the assignment interval. Herein, the target code quantity T[j] is calculated for respective frames ranging from the j-th frame to the (j+L−1)-th frame. Also, the total code quantity Ra[j] of (a) the event that a relation between the frame L and the GOP is such that the assignment unit of the code quantity is the GOP unit (the frame L is a multiple of N (Integer) of the GOP) is different from that of (b) the event that a relation is such that the assignment unit of the code quantity is not the GOP unit (the frame L is not a multiple of N (Integer) of the GOP), and in (a) the event that the assignment unit of the code quantity is the GOP unit (the frame L is a multiple of N (Integer) of the GOP), Ra[j] is calculated as $$Ra[j]=R/\mathrm{frame\_rate}*L.$$

Additionally, R is a bit rate for use in the main coding. Also, the total code quantity can be regulated, in consideration of a buffer occupancy BOC[j]. For example, Ra[j] is calculated as $$Ra[j]=R/\mathrm{frame\_rate}*L-BOC[j].$$

In (b) the event that the assignment unit of the code quantity is not the GOP unit (the frame L is not a multiple of N (Integer) of the GOP), Ra [j] is calculated as $$Ra[j]=R/\mathrm{frame\_rate}*L-S\mathrm{sum}.$$

Herein, in the event that the frame number within one GOP was set at N, $S_{sum}$ is the summation of the generation code quantity in (N−L) frames coded just before.

And, Ra[j] is updated frame by frame.

The buffer constraint regulation means 202 is means for determining whether or not the code quantity assigned in the initial allocation of the code quantity violated the constraint of the buffer in the assignment interval, and, in the event that it violated the constraint, it regulates the assignment of the code quantity. That is, the buffer constraint regulation means 202 is means for assigning the code quantity so that the overflow or the underflow does not occur in the buffer.

Hereinafter, explanation is given specifically.

At first, the buffer constraint regulation means 202 calculates the buffer occupancy of each picture from the code quantity assigned in the initial allocation, which is $$BOC[j]=BOC[j-1]+T[j]-R\mathrm{frame}$$

Herein, Rframe is the code quantity a frame that is calculated from the bit rate R for use in the main coding, which is $$R\mathrm{frame}=R/\mathrm{frame\_rate}.$$

Herein, an initial value of the buffer occupancy is set at 0 (zero) (BOC[0]=0).

For example, in the event that an upper limit of the coding buffer was set at B, it is determined whether or not BOC[j] is smaller than B-Rframe for all images in the interval to which the code quantity is assigned. And, in the event that BOC[j] exceeded B-Rframe, the reason is because the assignment of the code quantity was the assignment that gave rise to the overflow in the coding buffer, and the assignment is made so that the overflow does not occur by subtracting the assignment of the code quantity to the previous frames from the maximum j of BOC[j]. Furthermore, the subtracted portion's code quantity is added to the subsequent frames for re-allocation.

The overflow avoiding process will be explained.

FIG. 4 is a view for explaining the overflow avoiding process.

Figure 4A:
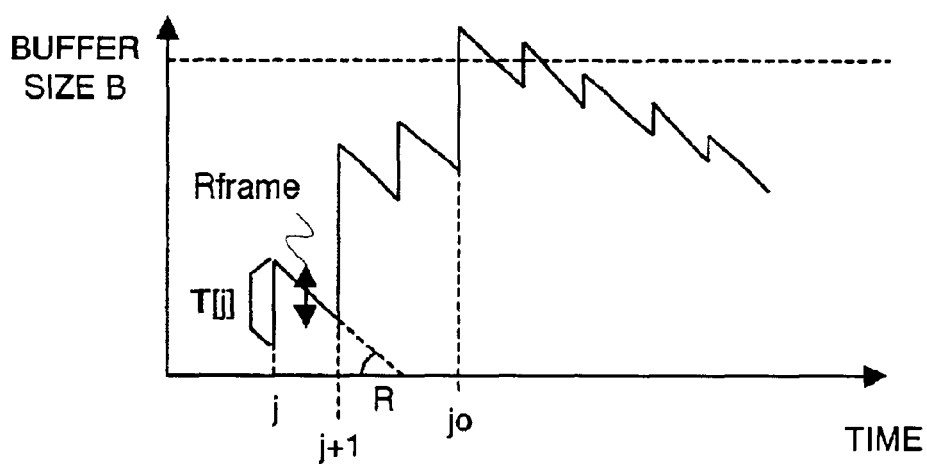
FIG. 4A is a view for explaining an overflow avoiding process.

At first, a transition of the BOC by the initial assignment is calculated, as shown in FIG. 4(a), in the event that the assignment of the code quantity became the assignment that gave rise to the overflow in the coding buffer, the frame jo, in which the occupancy in the coding buffer of the code becomes maximum, is detected, and as with the assignment of the assignment code quantity to the frames j to jo, as shown in FIG. 4 (b), its assignment is decreased so that the code quantity does not overflow at the frame jo from the coding buffer. And, the decreased portion's code quantity is assigned to the frames from jo+1 to j+L−1. Furthermore, it is determined whether or not BOC[j] is larger than 0 (zero), in the event that BOC[j] is smaller than 0 (zero), the reason is because the assignment of the code quantity was the assignment that gave rise to the overflow in the coding buffer, and the assignment is made so that the coding buffer does not give rise to the overflow by increasing the assignment of the code quantity to the frames prior to j of which BOC[j] is minimum. And, the increased portion's code quantity is subtracted from the subsequent frames for re-allocation.

The underflow avoiding process will be explained.

FIG. 5 is a view for explaining the underflow avoiding process.

Figure 5A:
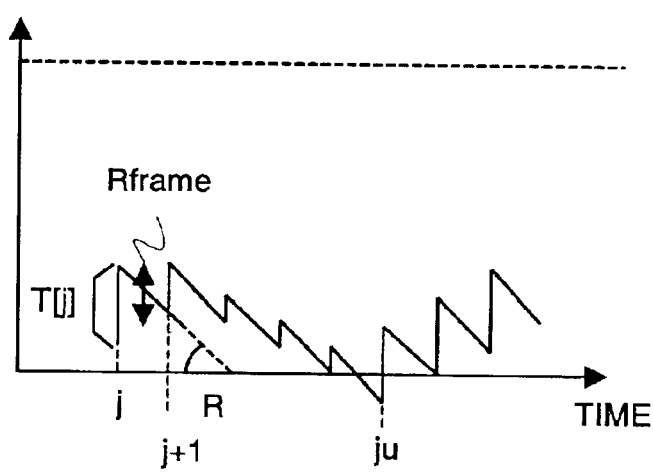
FIG. 5A is a view for explaining an underflow avoiding process.
Figure 5B:
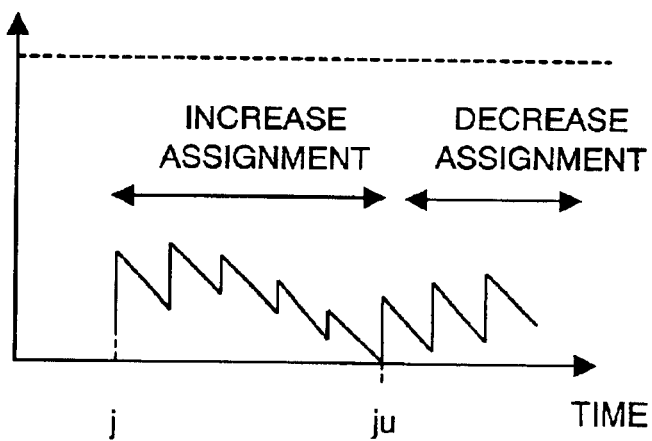
FIG. 5B is a view for explaining an underflow avoiding process.

At first, a transition of the BOC by the initial assignment is calculated, as shown in FIG. 5(a), in the event that the assignment of the code quantity became the assignment that gave rise to the underflow in the coding buffer, the frame ju, in which the occupancy in the coding buffer of the code becomes minimum, is detected, and as with the code quantity assigned to the frames j to ju, as shown in FIG. 5(b), the assignment of its code quantity is increased so that the coding buffer does not give rise to the underflow in ju. And, the increased portion's code quantity is subtracted from the code quantity assigned to the frames ju+1 to j+L−1.

Hereafter, the similar process is executed repeatedly within the interval of the assignment interval of the code quantity until the coding buffer does not give rise to the overflow or the underflow.

Additionally, the limitation to the upper limit and the lower limit of the buffer can be regulated by the use of a margin.

In such a manner, the assignment of the code quantity, which satisfies the constraint of the buffer, is made to regulate the assignment code quantity of each picture, and the regulated code quantity is set at new assignment code quantity T[j]. And, the code quantity control is taken in the main coding with this assignment code quantity T[j] set at target code quantity.

Additionally, the complexity degree X[j], the buffer occupancy BOC[J] by the assignment code quantity, and so forth may be added to information, with which the code quantity is controlled, in addition to the assignment code quantity T[j].

So as to take a timing so that the target code quantity calculated for the images that were input and the above images are input into the main coding means 30 simultaneously, the delay means 40 is means for delaying the images, which are input, according to an analysis period length, and the process delay of the pre-analysis means 10 and the code assignment means 20. For example, in the pre-analysis means 10, it becomes necessary to delay the images to be coded by L-frame's portion, and, in the event of pre-analyzing, by more than L-frame's portion.

The main coding means 30, which is configured of code quantity controlling means 301, moving image coding means 302, and an coding buffer 303, is means for coding the input images delayed in the delay means 40, based on information from code assignment means 29, to output them as coding data.

Hereinafter, each configuration element will be explained.

The code quantity controlling means 301 calculates the quantization scale, based on information given from the code assignment means 20, to transmit this calculation result to the moving image coding means 302. And, the generation code quantity after coding the images is measured to determine whether or not a difference exists between the generation code quantity and the assigned code quantity, and, in the event that a difference exists, by taking a feedback control, the code quantity is controlled so that the code quantity approaches a predetermined bit rate. For example, the target code quantity is allocated by the process unit obtained by subdividing one frame further, and a difference unit between the target code quantity and the generation code quantity is accumulated subdivided process unit by subdivided process unit to determine whether or not the accumulation of the difference of the code quantity exceeded the assigned code quantity. And, in the event that the accumulation of the difference of the code quantity exceeded the assigned code quantity, the quantization scale is increased in subsequent coding to suppress the generation of the code quantity. On the other hand, in the event that the accumulation of the difference of the code quantity fell below the assigned code quantity, the quantization scale is reduced in subsequent coding to increase the generation of the code quantity. Furthermore, the code quantity controlling means 301 supervises the buffer occupancy of the coding buffer 303, and supervises so that the code quantity that occurs in coding does not give rise to the overflow or the underflow in the coding buffer 303 to take the control such as the regulation of the quantization scale and stuffing. For example, in the event of avoiding the overflow of the coding buffer 303, the quantization scale is enlarged to suppress the generation of the code, or information to be coded is curtailed to suppress the generation code quantity. On the other hand, in the event of avoiding the underflow of the coding buffer 303, the quantization scale is reduced to increase the generation quantity of the code, or the stuffing is made to increase the generation code quantity.

The moving image coding means 302 performs the coding process for the images, which were input, according to a parameter that was given, generates the compressed data, and simultaneously measures the generation code quantity to notify it to the code quantity controlling means 301. Additionally, herein, an MPEG1 video (ISO/IEC-11172-2) and an MPEG2 video (ISO/IEC-13818-2) are known as the method of the coding process for the images, and it is also possible to employ these as the method of the coding process for the images.

The coding buffer 303 is a buffer that accumulates the data coded in the moving image coding means 302, and output it at a fixed bit rate. This coding buffer 303 absorbs fluctuation of the generation code quantity of each image.

The operation in the above-mentioned configuration will be explained.

Figure 11:
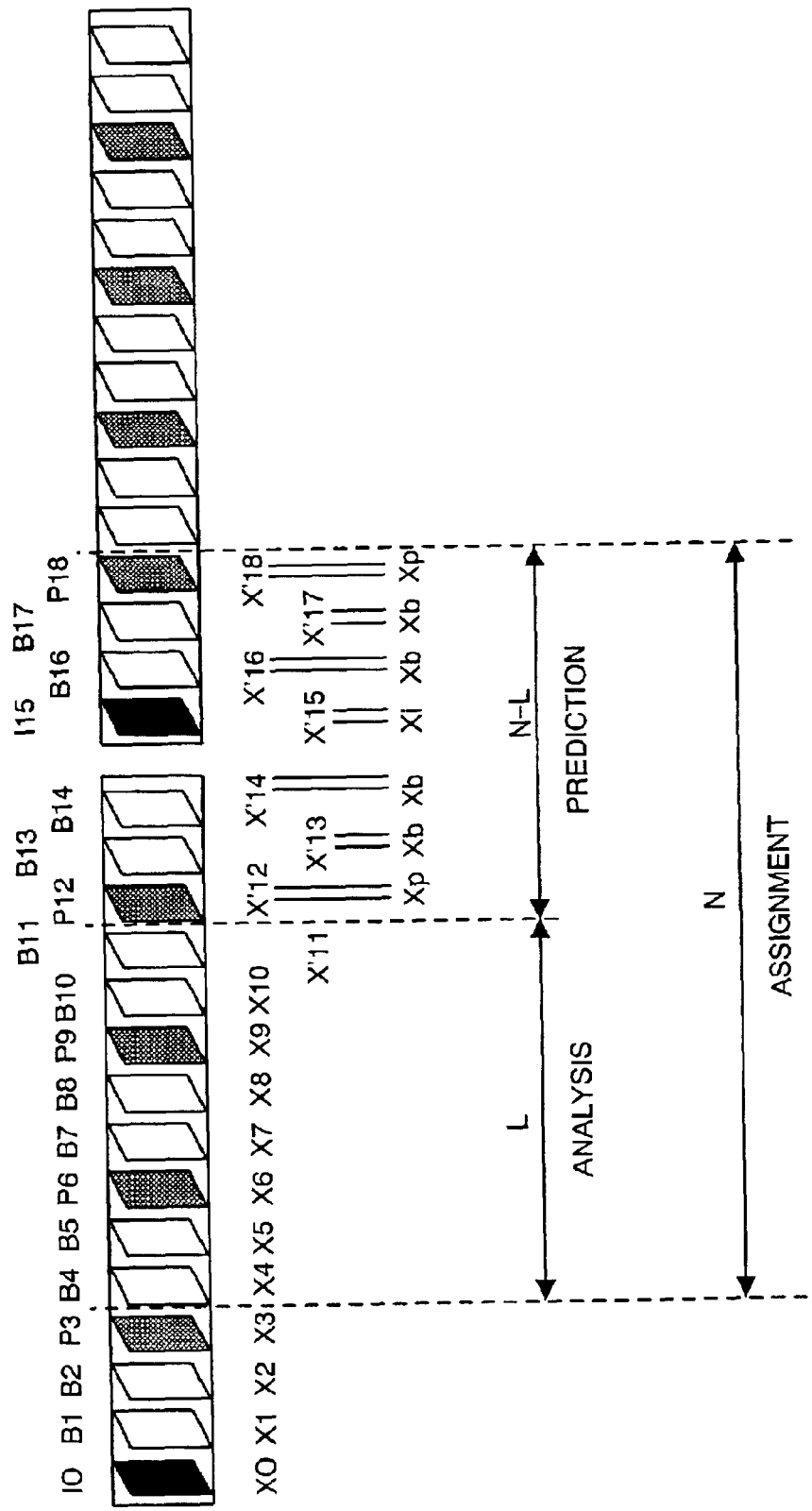
FIG. 11 is a view for explaining prediction of complexity degrees.
Figure 12:
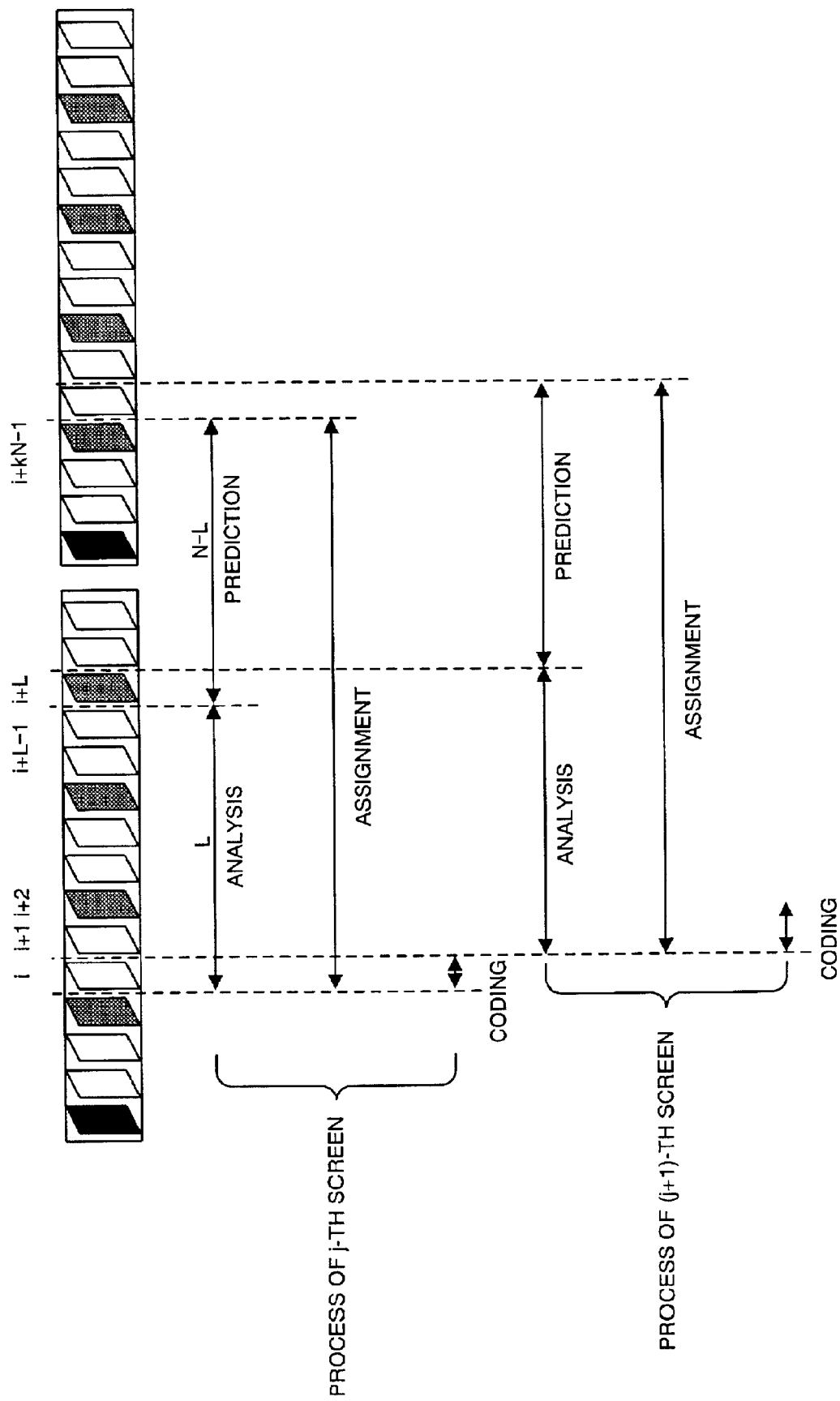
FIG. 12 is a view for explaining prediction of complexity degrees.
Figure 13:
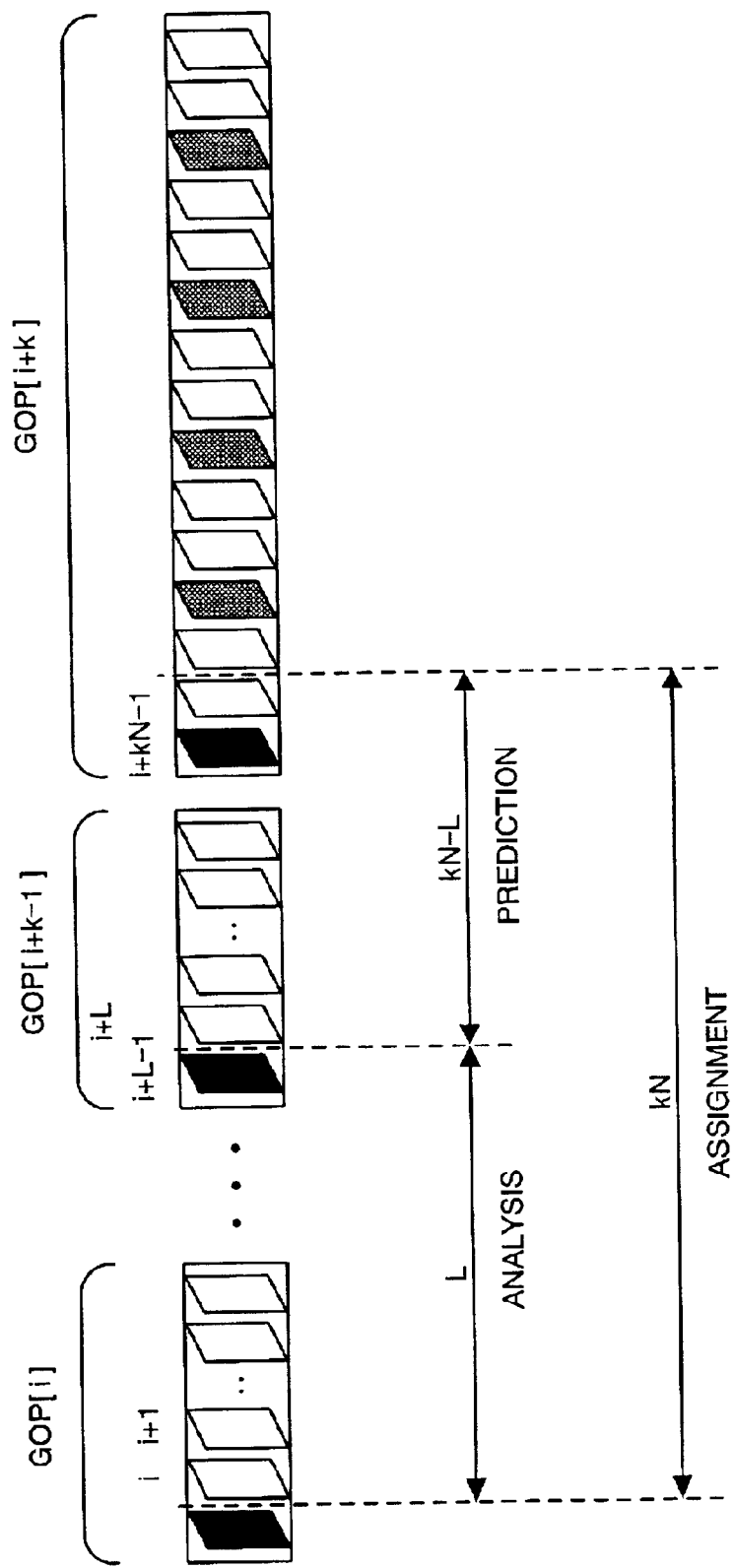
FIG. 13 is a view for explaining prediction of complexity degrees.
Figure 14:
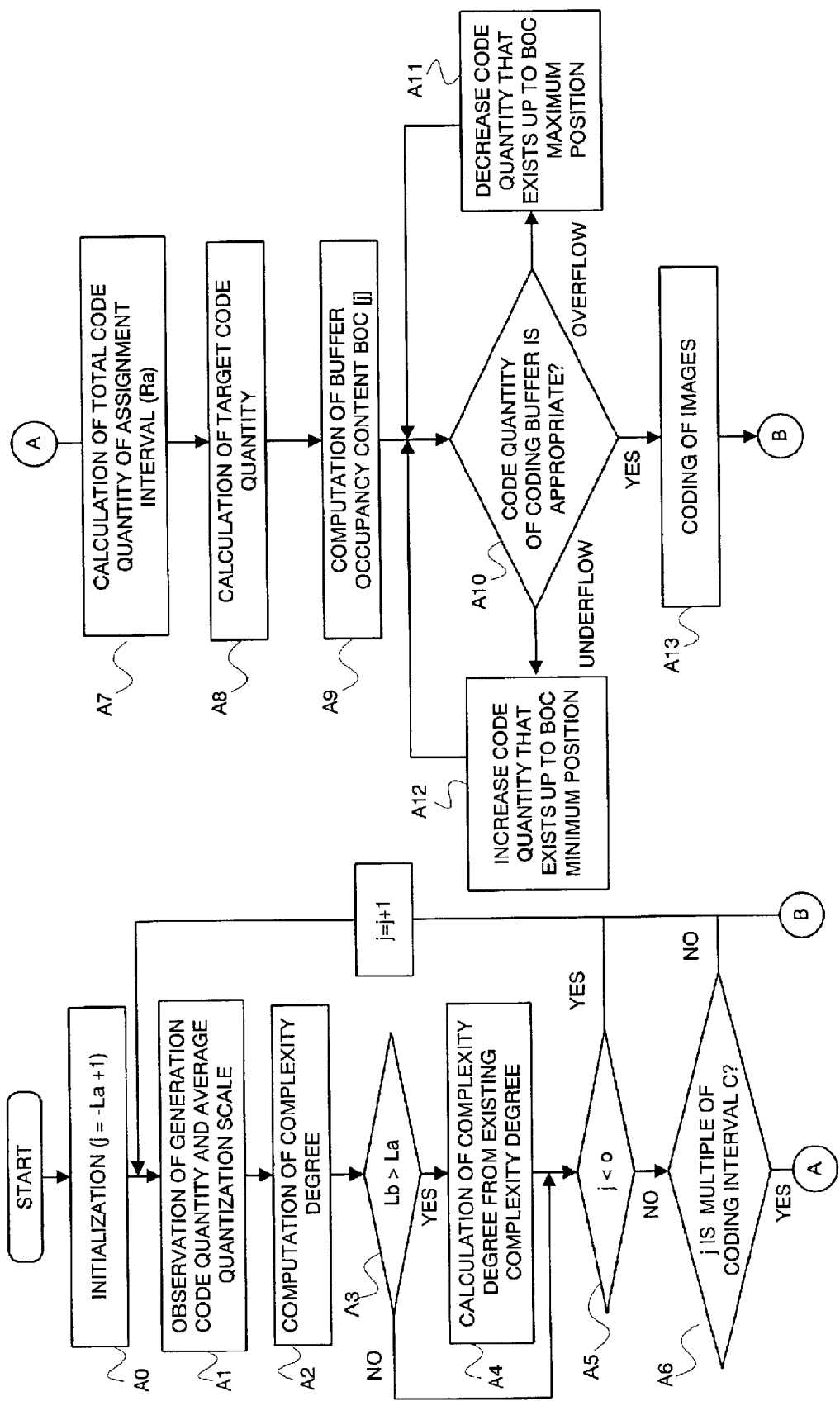
FIG. 14 is a flowchart for explaining an operation of this embodiment.
Figure 15:
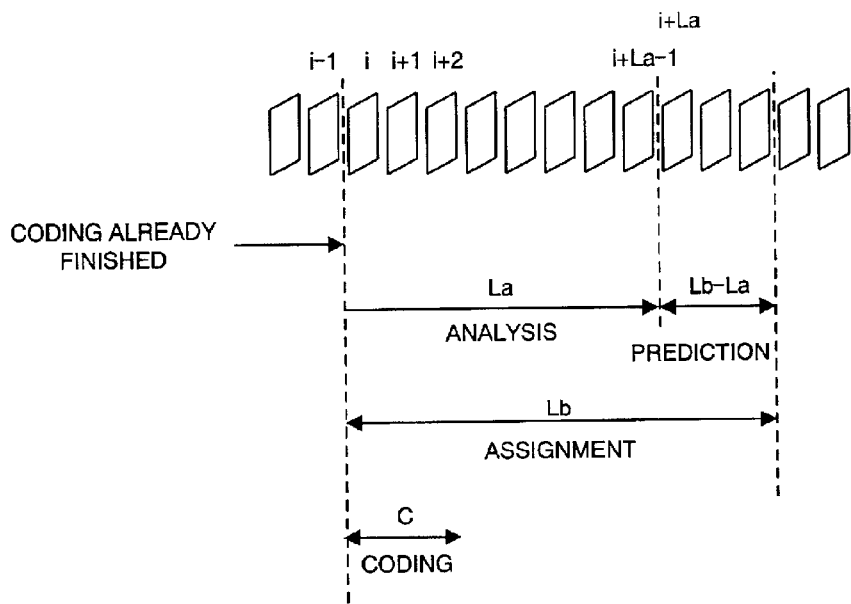
FIG. 15 is a view for explaining an operation of this embodiment.

FIG. 6, FIG. 7, FIG. 8, FIG. 9 and FIG. 10 are views for explaining a relation between the picture number and the picture number that is included within the GOP. FIG. 11, FIG. 12 and FIG. 13 are views for explaining the prediction of the complexity degrees. FIG. 14 is a flowchart for explaining the operation of this embodiment. FIG. 15 is a view for explaining the operation of this embodiment.

At first, an outline of the operation of this embodiment will be explained.

As to the operation in coding the images, there are the event (A) that the picture number L in the pre-analysis interval is the same as the picture number N that is included within one GOP, the event (B) that the picture number L in the pre-analysis interval is larger than the picture number N that is included within one GOP and yet is a multiple of N (Integer), the event (C) that the picture number L in the pre-analysis interval is smaller than the picture number N that is included within one GOP, and the event (D) that the picture number L in the pre-analysis interval is more than the picture number N that is included within one GOP, and yet is not a multiple of N (Integer). Hereinafter, each event will be explained.

The event (A) will be explained that the picture number L in the pre-analysis interval is the same as the picture number N that is included within one GOP.

Figure 6:
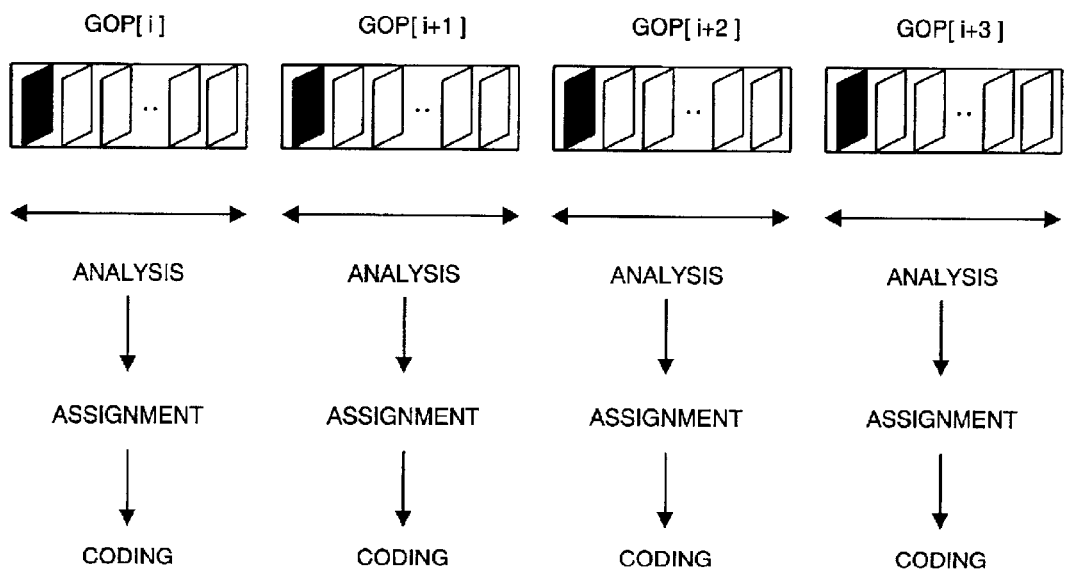
FIG. 6 is a view for explaining a relation between the picture number and the picture number that is included within a GOP.

As shown in FIG. 6, prior to coding the images of one GOP, the images of this one GOP are analyzed to calculate the complexity degree of each image within one GOP. And, the target code quantity of one GOP is calculated from the calculated complexity degrees to make the coding for the images of the GOP according to the target code quantity.

The event (B) will be explained that the picture number L in the pre-analysis interval is larger than the picture number N that is included within one GOP and yet is a multiple of N (Integer).

Figure 7:
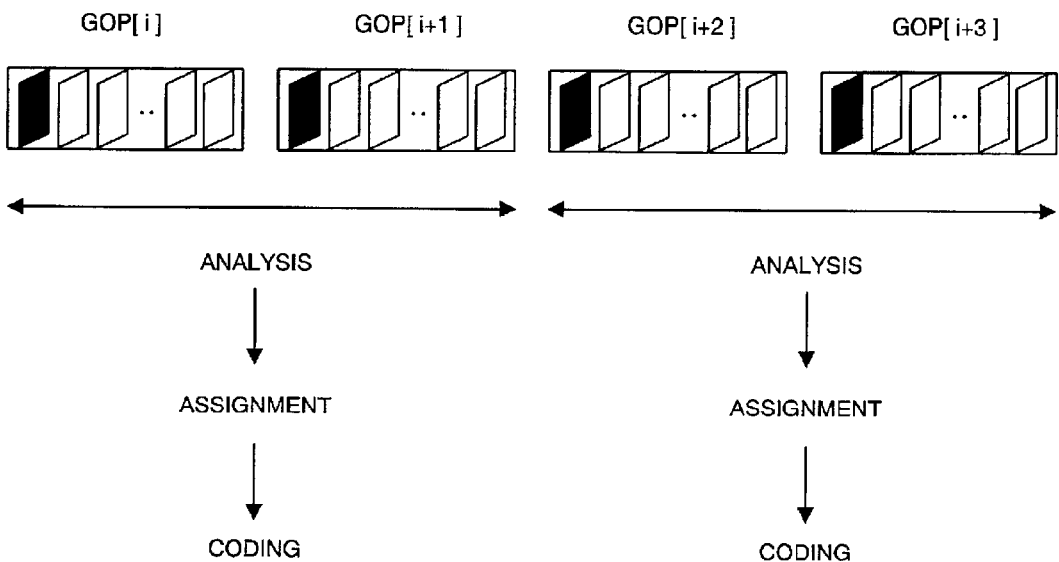
FIG. 7 is a view for explaining a relation between the picture number and the picture number that is included within a GOP.

For example, FIG. 7 is an example of L=2N. Additionally, L is set at a multiple of N.

Figure 8:
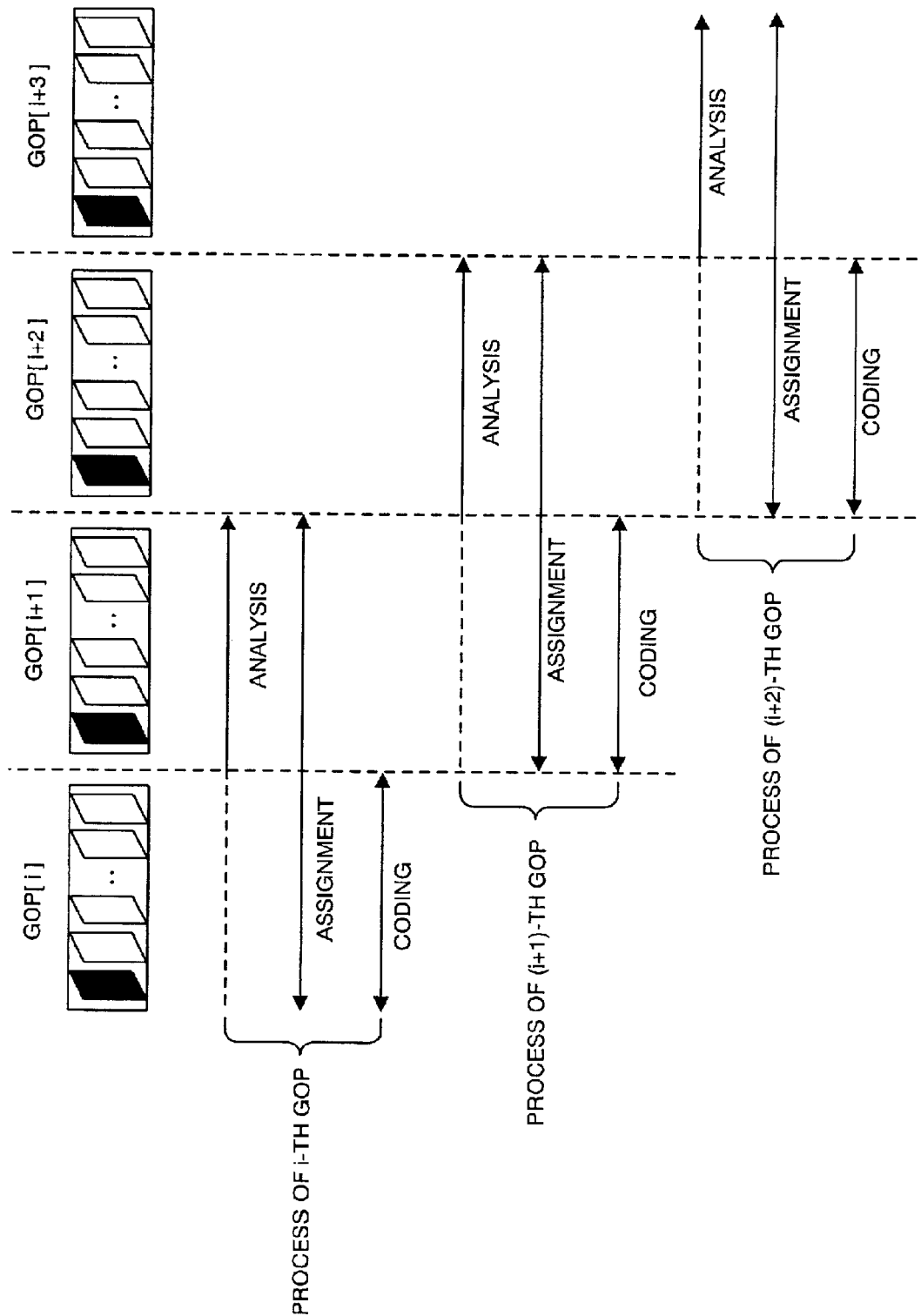
FIG. 8 is a view for explaining a relation between the picture number and the picture number that is included within a GOP.

Prior to coding the images of two GOPs, the images of two GOPs are analyzed to calculate the complexity degree of each image within two GOPs. And, the target code quantity that is assigned to two GOPs is calculated from the calculated complexity degrees to make the coding for the images of two GOPs according to this target code quantity. Additionally, the interval in which the coding is made may be shorter than the assignment interval. For example, as shown in FIG. 8, after two-GOP portion's images were analyzed to calculate the target code quantity of two GOPs, only GOP[j] out of them, which is one head GOP, is coded. And, when the sequence proceeds up to the process for the next GOP, the analysis of the images proceeds up to GOP [j+2], based on the analysis data of two-GOP portion, GOP[j+1] and GOP[j+2], the assignment of code quantity is made for two GOPs, GOP[j+1] and GOP[j+2], and the coding is made for GOP[j+1].

Figure 9:
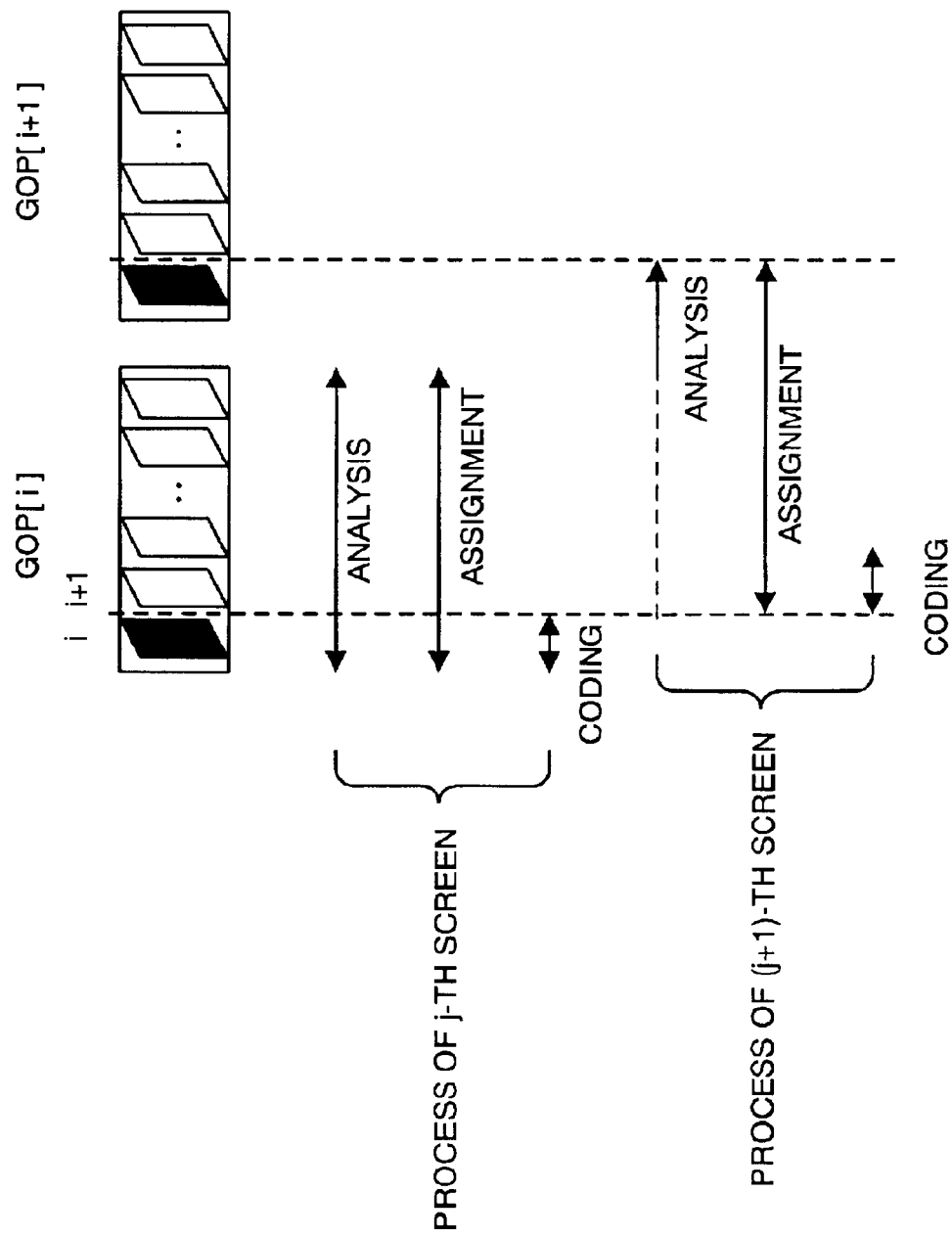
FIG. 9 is a view for explaining a relation between the picture number and the picture number that is included within a GOP.

Additionally, the interval for the coding may be shorter than the assignment interval, and the frame number thereof may be free. For example, as shown in FIG. 9, the coding may be made one picture by one picture, in the event that the picture number within the GOP is set at N, and that the coding process is performed for the j-th frame and forward, the analysis is made as far as the (j+N−1)-th frame, and the assignment of the code is made for the frames ranging from the j-th frame to the (j+N−1)-th frame. And, the coding is made according to the target code quantity assigned to the j-th frame.

The event (C) will be explained that the picture number L in the pre-analysis interval is smaller than the picture number N that is included within one GOP.

Figure 10:
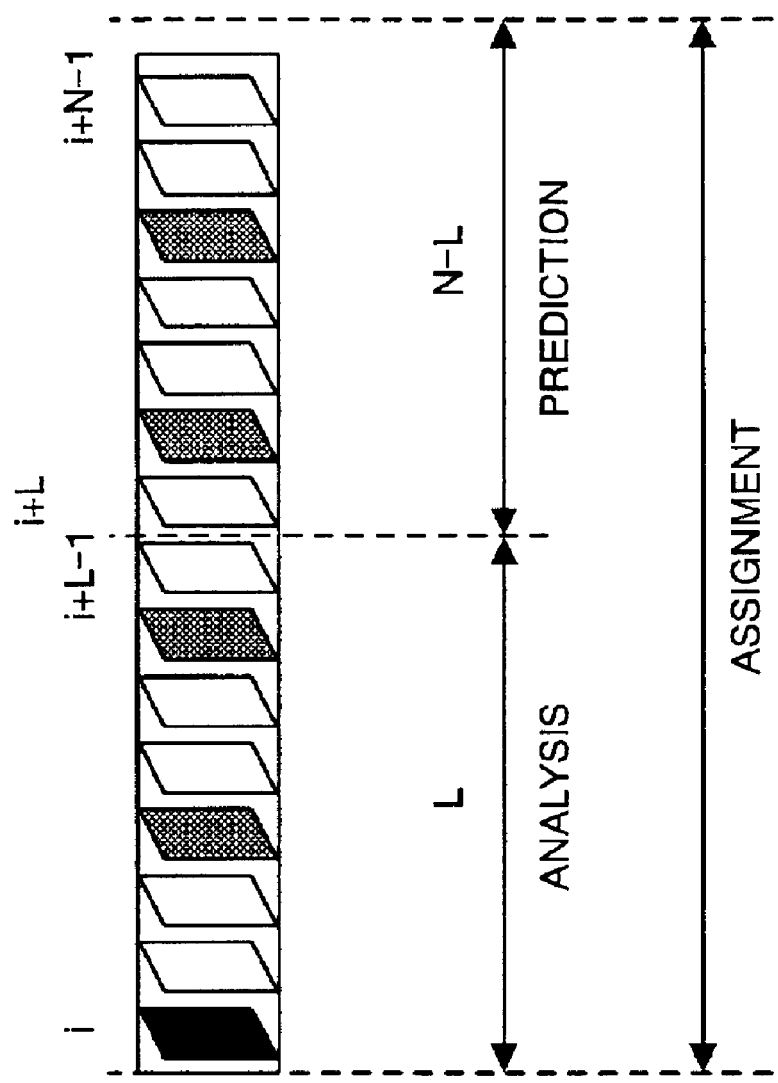
FIG. 10 is a view for explaining a relation between the picture number and the picture number that is included within a GOP.

FIG. 10 says the event that the picture number L in the pre-analysis interval is smaller than the picture number N that is included within one GOP.

As with the assignment of the code, the GOP unit is desirable so as to absorb the fluctuation among the pictures; however the complexity degree of the part in which the GOP size is not satisfied is predicted from the images that were already analyzed. For example, as shown in FIG. 10, the analysis was already finished as far as the frame j+L−1 that was L picture(s) ahead, and in the event that the coding process is performed in the j-th frame and forward, the complexity degrees in the frames ranging from the frame j+L, which does not meet N, to the frame j+N−1 are predicted. For example, three kinds of pictures, I picture, P picture, and B picture, for use in the MPEG 1 or the MPEG 2 are employed, the symbols in the upper side of FIG. 11 are set to indicate a picture type and a frame number, the symbols in the lower side to indicate the complexity degree of the pictures, as shown in FIG. 11, the size N of the GOP is 15, which is set at an assignment interval length Lb, the analysis interval length L is 8, which becomes La, the head of the GOP is I picture, I or P picture are arranged every three pictures, the other pictures than these are set at B picture, and in the event that the picture ranging from I0 to B11 were already analyzed, the complexity degree X' that corresponds to 7 pictures, P12 to P18, for which the complexity degree was not calculated, is calculated by the use of the average value or the latest value of each picture type, which becomes $$X'15 = Xi = X0$$

$$X'12 = X'18 = Xp = (X6 + X9)/2$$

$$X'13 = X'14 = X'16 = X'17 = Xb = (X4 + X5 + X7 + X8 + X10 + X11)/6.$$

Additionally, in the event that the same picture type does not exist for a period during which the images were analyzed, the complexity of the same picture type analyzed of late is set at the degree of this event. Also, the interval to be code may be each GOP as shown in FIG. 6, may be each picture as shown in FIG. 12, and the frame number thereof may be arbitrary number.

And, based on the predicted complexity degrees, the target code quantity that is assigned to the GOP is calculated to make the coding for the images of the GOP according to this target code quantity.

The event (D) will be explained that the picture number L in the pre-analysis interval is more than the picture number N that is included within one GOP, and yet is not a multiple of N (Integer).

As shown in FIG. 13, k is set at a minimum integer that is L/N or more, the complexity degree of the interval of (kN−L) that does not reach kN is predicted from the complexity degree that was already analyzed to make the assignment for the kN interval. And, based on the predicted complexity degree, the target code quantity that is assigned to the GOP is calculated to make the coding for the images of the GOP according to this target code quantity.

Continually, the explanation is given by the use of the flowchart of FIG. 14.

Additionally, so as to make the explanation of the operation easy, as shown in FIG. 15, the number of the frame, in which the images (moving images) that were input by the time that the frame j was coded can be analyzed, is set at La, and the number of the frame, which exists in the interval (hereinafter, referred to as an assignment interval) for which the assignment of the code quantity is made, is set at Lb.

The moving image characteristics observation means 101 initializes the frame j of the images, which were input, as −La+1 (Step A0) to observe the generation code quantity and the average quantization scale in the event that the images were coded (Step A1).

The complexity degree calculation means 102 calculates the complexity degrees, based on the generation code quantity and the average quantization scales of the images observed in the moving image characteristics observation means 101. For example, in the event that the generation code quantity of the frame j+La−1 was set at S [j+La−1] and the average quantization scale at Q[j+La−1], the complexity degree X[j+La−1] is calculated as $$X[j+La-1] = S[j+La-1]*Q[j+La-1]$$

(Step A2).

The complexity degree calculation means 102 compares the number La of the frames in which the images can be analyzed with the number Lb of the frames that exist in the assignment interval of the code quantity (Step A3).

In the event that the frame number Lb is larger than the frame number La in which the images can be analyzed (Lb>La), the complexity degree of the part that does not reach the assignment interval is calculated from the complexity degree of the images that were already analyzed. For example, three kinds of pictures, I picture, P picture, and B picture, for use in the MPEG 1 or the MPEG 2 are employed, the symbols in the upper side of FIG. 11 are set to indicate the picture type and the frame number, the symbols in the lower side to indicate the complexity degrees of the pictures, as shown in FIG. 11, the size N of the GOP is 15, which is set at an assignment interval length Lb, the analysis interval length L is 8, which becomes La, the head of the GOP is I picture, I or P picture are arranged every three pictures, the other pictures than these are set at B picture, and, in the event that the picture ranging from I0 to B11 were already analyzed, the complexity degree X' that corresponds to 7 pictures, P12 to P18, for which the complexity degree was not calculated, is calculated by the use of the average value or the latest value of each picture type, which becomes $$X'15 = Xi = X0$$

$$X'12 = X'18 = Xp = (X6 + X9)/2$$

$$X'13 = X'14 = X'16 = X'17 = Xb = (X4 + X5 + X7 + X8 + X10 + X11)/6.$$

Additionally, in the event that the same picture type does not exist for a period during which the images were analyzed, the complexity of the same picture type analyzed of late is set at the degree of this event (Step A4).

On the other hand, in the event that the number Lb of the frame that exists in the assignment interval of the code quantity is less than the number La of the frame in which the images can be analyzed (Lb≦La), it is unnecessary to predict the complexity degrees, whereby the sequence proceeds to the next step.

The complexity degree calculation means 102 determines whether or not the frame j, into which the images were input, reaches the frame number La (Step A5).

In the event that the number of the frame of the images that were input is below the frame number La (that is, in the event that the frame j of the images initialized as—La+1 is j<0), the complexity degree calculation means 102 increases the value of j and calculates the complexity degrees of the next images (Step A1, A2, A3, and A4).

On the other hand, in the event that the number of the frame of the images that were input became the same as the frame number La (j=0), the complexity degree calculation means 102 determines whether or not the frame j is a multiple of N (Integer) of a unit interval C in which the coding process is performed (Step A6).

In the event that the frame j is not a multiple of N (Integer) of a unit interval C in which the coding process is performed, the complexity degree calculation means 102 increases the value of j and calculates the complexity degrees of the next images (Step A1, A2, A3, and A4).

On the other hand, in the event that the frame j is a multiple of N (Integer) of a unit interval C in which the coding process is performed, the code assignment means 20 makes the assignment of the code quantity for the assignment interval.

At first, the total code quantity within the assignment interval is calculated. For example, in the event that the assignment interval of the code quantity is set at L frame and the total code quantity that is assigned to the frames ranging from the j-th frame to the (j+L−1)-th at Ra[j], the total code quantity Ra[j] of (a) the event that a relation between the frame L and the GOP is such that the assignment unit of the code quantity is the GOP unit (the frame L is a multiple of N (Integer) of the GOP) is different from that of (b) the event that a relation is such that the assignment unit of the code quantity is not the GOP unit (the frame L is not a multiple of N (Integer) of the GOP), and in (a) the event that the assignment unit of the code quantity is the GOP unit (the frame L is a multiple of N (Integer) of the GOP), Ra[j] is calculated as $Ra[j]=R/\text{frame\_rate}*L$ Additionally, R is a bit rate for use in the main coding. Also, in consideration of the buffer occupancy BOC[j], it is also possible to regulate the total code quantity. For example, Ra[j] is calculated as $Ra[j]=R/\text{frame\_rate}*L-BOC[j].$ In (b) the event that the assignment unit of the code quantity is not the GOP unit (the frame L is not a multiple of N (Integer) of the GOP), Ra [j] is calculated as $Ra[j]=R/\text{frame\_rate}*L-S\text{sum}$ Herein, in the event that the frame number within one GOP is N, $S_{sum}$ is the summation of the generation code quantity in (N-L) frame (s) in which the coding was made just before (Step A7).

Next, the code quantity assignment means 20 calculates the target code quantity of each frame.

By making proportional allocation for the total code quantity Ra[j], which can be assigned to the assignment interval of the code quantity, with the complexity degree X[j], the target code quantity T[j] of each frame is calculated as $T[j]=X[j]/X\text{sum}*Ra[j]$ $$X sum = \sum_{k=j}^{j+L-1} X[k].$$

Additionally, $X_{sum}$ indicates the summation of the complexity degree of the assignment interval. Herein, the target code quantity T [j] is calculated for respective frames ranging from the frame j to the frame j+L−1 (Step A8).

The buffer constraint regulation means 202 calculates the buffer occupancy in the coding buffer of the assigned target code quantity. For example, in the event that the buffer occupancy is set at BOC, the buffer occupancy BOC is calculated as $BOC[j]=BOC[j-1]+T[j]-R\text{frame}$ Herein, Rframe is the code quantity a frame that was calculated from the bit rate R for use in the main coding, which is $R\text{frame}=R/\text{frame\_rate}.$ Herein, an initial value of the buffer occupancy is set at 0 (zero) (BOC[0]=0) (Step A9).

The buffer constraint regulation means 202 determines whether or not the coding buffer gives rise to the overflow or the underflow, based on the calculated buffer occupancy. For example, in the event that the upper limit of the coding buffer was set at B, it is determined whether or not the buffer occupancy BOC[j] is smaller than B-Rframe (Step A10).

Figure 4B:
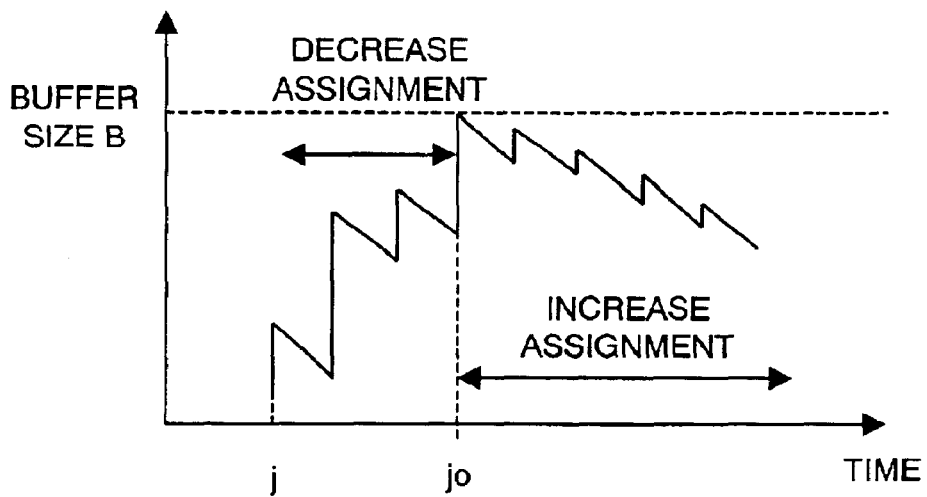
FIG. 4B is a view for explaining an overflow avoiding process.

In the event that the coding buffer gave rise to the overflow, the buffer constraint regulation means 202 regulates the code quantity so that the coding buffer does not give rise to the overflow. For example, as shown in FIG. 4(a), in the event that the assignment of the code became the assignment whereby the coding buffer gave rise to the overflow, the frame jo in which the occupancy of the code quantity in the coding buffer became maximum is detected, and, as with the code quantity assigned to the frames ranging from the frame j to the jo, as shown in FIG. 4(b), the assignment of its code quantity is decreased so that the coding buffer does not give rise to the overflow in jo. And, the decreased portion's code quantity is assigned to the frames, jo+1 to j+L−1 (Step A11).

On the other hand, in the event that the coding buffer gave rise to the underflow, the buffer constraint regulation means 202 regulates the code quantity so that the coding buffer does not give rise to the underflow. For example, as shown in FIG. 5(a), in the event that the assignment of the code became the assignment whereby the coding buffer gave rise to the underflow, the frame ju in which the occupancy of the code quantity of the coding buffer became minimum is detected, and as with the code assigned to the frames ranging from the frame j to the ju, as shown in FIG. 5(b), its assignment is increased so that the coding buffer does not give rise to the underflow in ju. And, the increased portion's code quantity is subtracted from the code quantity assigned to the frames, ju+1 to j+L−1 (Step A12).

Furthermore, in the event that the assignment of the code became the assignment whereby the coding buffer does not either the overflow or the underflow, the main coding means 30 makes the coding for the frames j to j+c−1 delayed in the delay means 40 (Step A13).

Additionally, in the event that the unit interval C by which the coding process is performed is 1, the Step A6 can be omitted. In the event that La and Lb are the fixed values, the Step A3 is omitted, and the Step A4 is always executed, or it is also possible that the Step A4 is not constantly executed (both of the Step A3 and the Step A4 are omitted). Also, the frame number La of the analysis interval, the frame number Lb that exists in the assignment interval, and the coding interval C do not always need to be the same, which are not limited to the combination described here.

A second embodiment will be explained.

Figure 16:
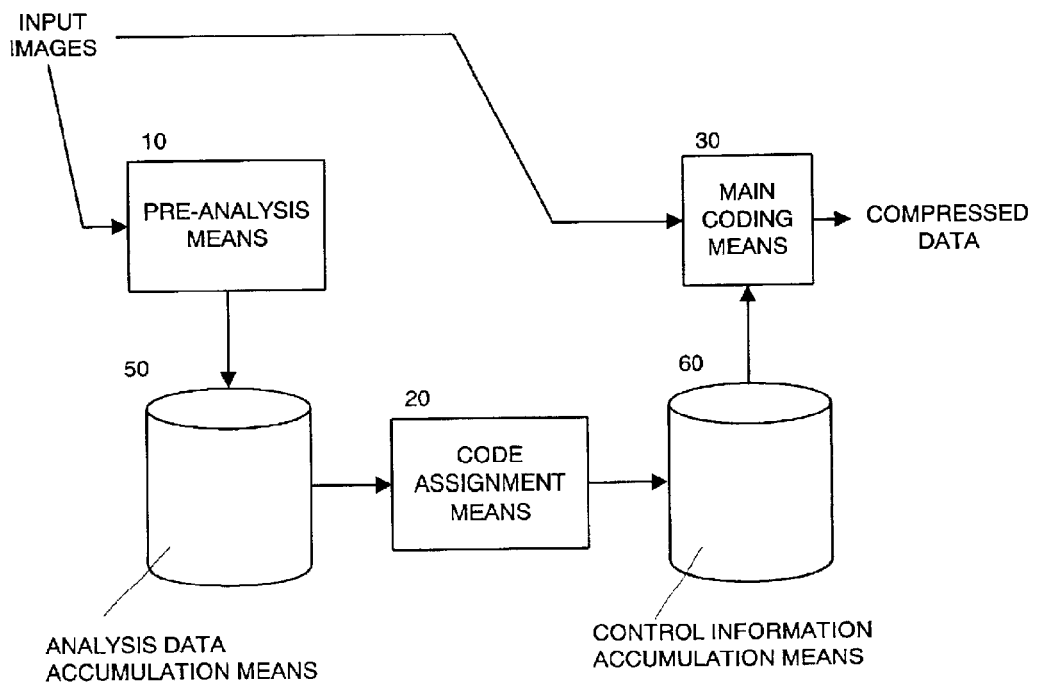
FIG. 16 is a block diagram of a moving image coding device.
Figure 17:
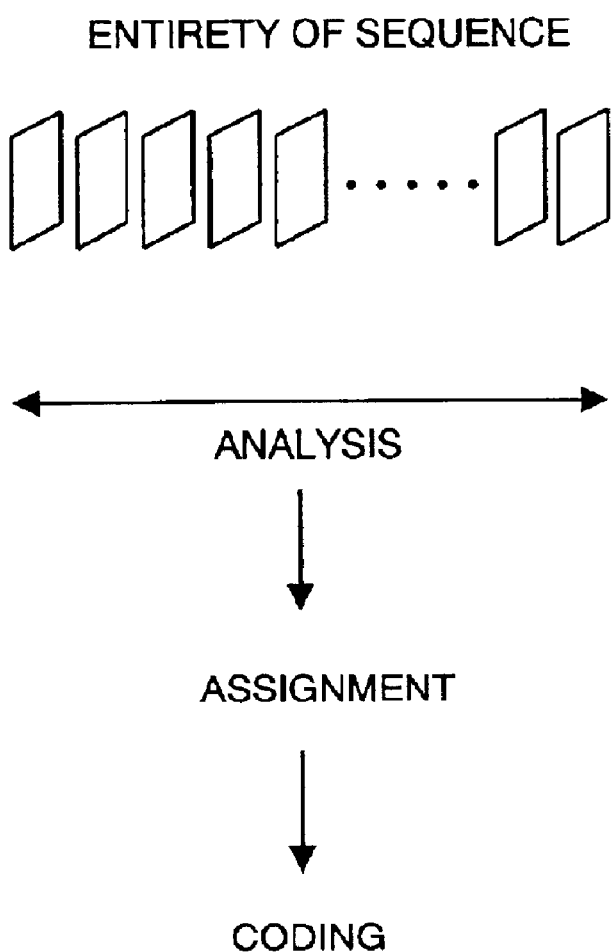
FIG. 17 is a view for explaining an operation of this embodiment.

FIG. 16 is a block diagram of the moving image coding device. FIG. 17 is a view for explaining the operation of this embodiment.

In the first embodiment, the device that coded the moving images in a real-time was explained; however in the second embodiment, as shown in FIG. 17, the allocation of the code quantity is made for the images of the entirety of the sequence, and further the suitable assignment of the code quantity is made.

At first, a configuration of the moving image coding device will be explained. Additionally, to the similar components to that of the moving image coding device of the first embodiment are affixed identical codes, and detailed explanation is omitted.

As shown in FIG. 16, the moving image coding device is configured of the pre-analysis means 10, analysis data accumulation means 50, the code assignment means 20, control information accumulation means 60, and the main coding means 30.

The analysis data accumulation means 50 is means for storing analysis information of the images analyzed in the pre-analysis means 10.

The control information accumulation means 60 is means for recording control data from the code assignment means 20.

Continually, the operation in the above-mentioned configuration will be explained.

Additionally, assume that, in this embodiment, the entirety of the sequence of the images that were input is already-known beforehand, the frame number is also finite, and its number is known.

The pre-analysis means 10, as shown in FIG. 17, analyzes the entirety of the images, which were input, at a time to transmit this analyzed information as the analysis data to the analysis data accumulation means 50, and the analysis data accumulation means 50 stores the analysis data from the pre-analysis means 10. And, the code assignment means 20 makes the assignment of the code quantity, based on the analysis data stored in the analysis data accumulation means 50, the designated bit rate, and a buffer size of the coding buffer 303, and calculates the target code quantity of each image in the entirety of the images that were input to transmit the control data based on this to the control information accumulation means 60, and the control information accumulation means 60 stores the control data from the analysis data accumulation means 50. Furthermore, the main coding means 30 generates the compressed data with the coding process of the images, based on the images that were input, and the control data stored in the control information accumulation means 60.

A third embodiment will be explained.

Figure 18:
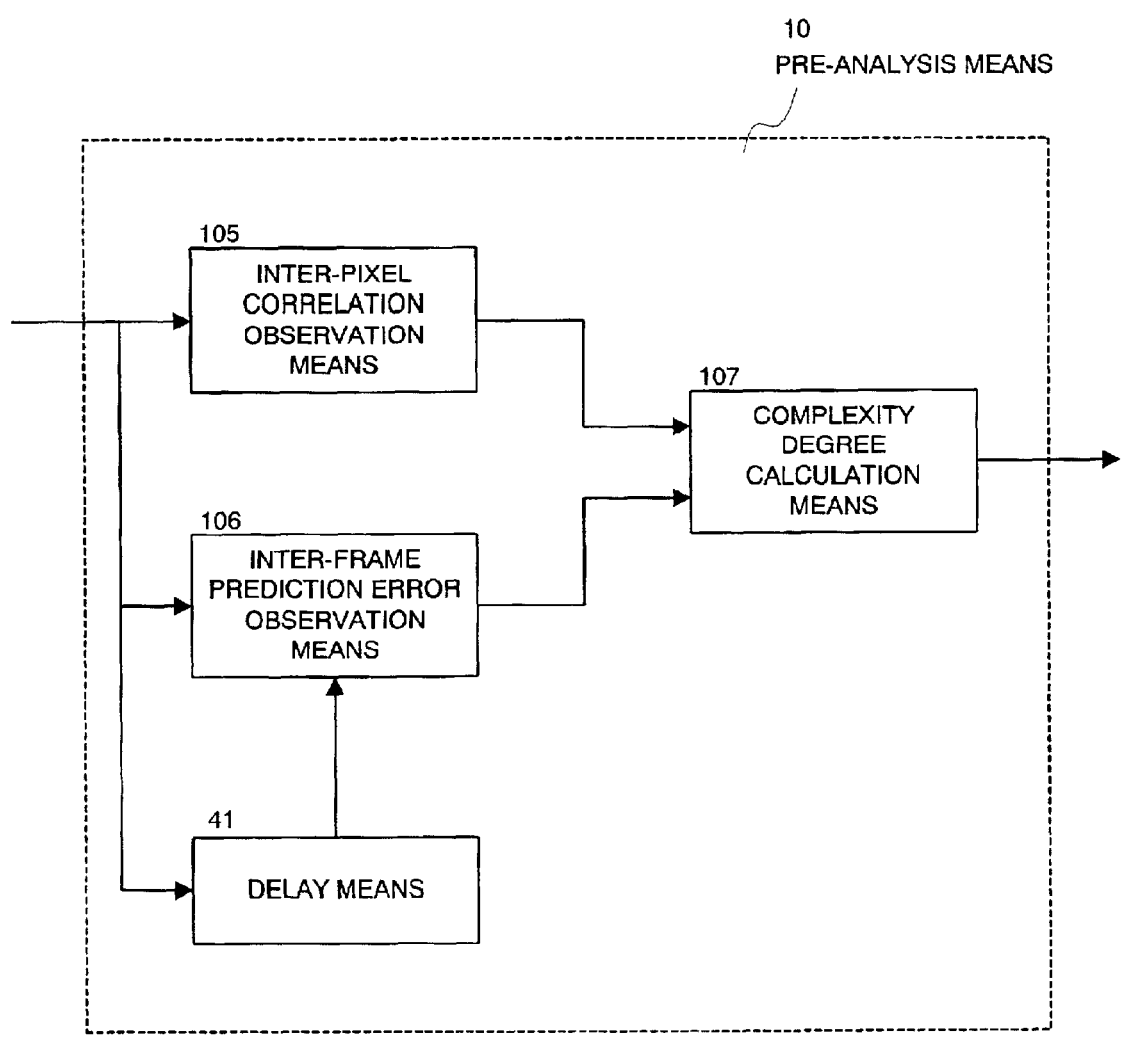
FIG. 18 is a block diagram of pre-analysis means 10.

FIG. 18 is a block diagram of the pre-analysis means 10.

In the first embodiment and the second embodiment, the generation code quantity was measured as the characteristics of the images; however, in this embodiment, in addition to measurement of the generation code quantity by pre-encoding as the characteristics of the frame, the statistic of the frame is measured to utilize the statistic that has a correlation with the complexity degree.

A configuration of the moving image coding device will be explained. Additionally, to the similar components to that of the moving image coding device of the first embodiment are affixed identical codes, and detailed explanation is omitted.

As shown in FIG. 18, the pre-analysis means 10 is configured of inter-pixel correlation observation means 105, delay means 41, inter-frame prediction error observation means 106, and complexity degree calculation means 107.

The inter-pixel correlation observation means 105 is means for calculating a correlation value between neighboring pixels within the frame of the images that were input. For example, it is means for calculating the sum A of the absolute value of a difference between neighboring pixels.

$$A = \sum_{x=1}^{H-1}\sum_{y=1}^{V}|I(x,y)-I(x+1,y)| + \sum_{x=1}^{H}\sum_{y=1}^{V-1}|I(x,y)-I(x,y+1)|$$

where I(x, y) is a pixel value at a position (x, y) of the image, H and V indicate a horizontal and a vertical frame sizes respectively.

The inter-frame prediction error observation means 106 is means for setting the input image, which was caused to be delayed in the delay means 41, at a reference image, to generate the prediction image with the inter-frame prediction method that is employed in coding the input images, and to calculate a difference between the input image and the prediction image. For example, it is means for calculating the sum E of the absolute value of a prediction error difference between the input image and the prediction image shown in the following equation.

$$E = \sum_{x=1}^{H}\sum_{y=1}^{V}|I(x,y)-P(x,y)|$$

where P(x, y) is a pixel value at a position (x, y) of the prediction image.

Or, it is means for calculating the sum-square of the prediction error shown in the following equation.

$$E = \sum_{x=1}^{H}\sum_{y=1}^{V}(I(x,y)-P(x,y))^2$$

Additionally, the delay means 41 may be used in common to the delay means 40 for the main coding.

The complexity degree calculation means 107 is means for calculating the complexity degrees from the characteristics of the observed images. For example, in the event that the complexity degree of the I picture was set at Xi, the complexity degree of the P picture at Xp, and the complexity degree of the B picture at Xb, it is known that there is a correlation between the calculated characteristics and the complexity degree, whereby Xi, Xp, and Xb can be estimated as $Xi=a*A$ $Xp=b*E$ $Xb=c*E$.

Herein, a, b, and c are parameters for estimating the complexity degrees, these values are calculated and established based on the result of having coded the already-known data beforehand, and the complexity degree X[j] of the frame j is calculated from the characteristics A[j] and E[j] of the frame j as $$X[j]=a*A[j]$$

in the case of the I picture, $$X[j]=b*E[j]$$

in the case of the P picture, and $$X[j]=c*E[j]$$

in the case of the B picture.

Continually, the operation of the above-mentioned configuration will be explained.

Additionally, in this embodiment, since only the configuration of the pre-analysis means 10 is different, and the other configurations than it are similar to that of the first embodiment, only the operation of the pre-analysis means 10 is explained, and the explanation of the other operations is omitted.

The images that were input into the moving image coding device are input into the inter-pixel correlation observation means 105, the delay means 41, and the inter-frame prediction error observation means 106 simultaneously, and in the inter-pixel correlation observation means 105 is calculated a correlation between the neighboring pixels within the frame of the images that were input. For example, the sum A of the absolute value of a difference between the neighboring pixels shown in the following equation is calculated.

$$A = \sum_{x=1}^{H-1}\sum_{y=1}^{V}|I(x,y)-I(x+1,y)| + \sum_{x=1}^{H}\sum_{y=1}^{V-1}|I(x,y)-I(x,y+1)|$$

where I(x, y) is a pixel value at a position (x, y) of the image, H and V indicate a horizontal and a vertical frame sizes respectively.

Also, the inter-frame prediction error observation means 106 generates the prediction images from the images that were input, and calculates a difference between the input image and the prediction image by setting the image, which was caused to be delayed in the delay means 41, at a reference image. For example, is calculated the sum E of the absolute value of a prediction error difference between the input image and the prediction image shown in the following equation.

$$E = \sum_{x=1}^{H}\sum_{y=1}^{V}|I(x,y)-P(x,y)|$$

where P(x, y) is a pixel value at a position (x, y) of the prediction image.

Or, is calculated the sum-square of the prediction error shown in the following equation.

$$E = \sum_{x=1}^{H}\sum_{y=1}^{V}(I(x,y)-P(x,y))^2$$

And, the complexity degree calculation means 107 calculates the complexity degrees, based on the sum A of the absolute value of a difference between the neighboring pixels calculated in the inter-pixel correlation observation means 105 and the sum E of the absolute value of the prediction error calculated in the inter-frame prediction error observation means 106. For example, in the event that the complexity degree of the I picture was set at Xi, the complexity degree of the P picture at Xp, and the complexity degree of the B picture at Xb, it is known that there is a correlation between the calculated characteristics and the complexity degree, whereby Xi, Xp, and Xb can be estimated as $$Xi=a*A$$

$$Xp=b*E$$

$$Xb=c*E.$$

Herein, a, b, and c are parameters for estimating the complexity degrees, these values can be calculated and established from the result of having coded the already-known data beforehand, and the complexity degree X[j] of the frame j is calculated from the characteristics A[j] and E[j] of the frame j by the use of the above-mentioned equation as $$X[j]=a*A[j]$$

in the case of the I picture, $$X[j]=b*E[j]$$

in the case of the P picture, and $$X[j]=c*E[j]$$

in the case of the B picture. Hereinafter, the coding of the images is made with a similar operation to that of the first embodiment.

A fourth embodiment will be explained.

In the above-mentioned embodiment, a special process was not performed for the images being input; however, in this embodiment, so as to reduce computing quantity, in addition to reducing the size of the images that were input to reduce the number of the pixel, the similar process to that of the third embodiment is performed.

At first, a configuration of the moving image coding device will be explained.

Additionally, to the similar components to that of the moving image coding devices of the first embodiment and the third embodiment is affixed identical codes, and detailed explanation is omitted.

Figure 19:
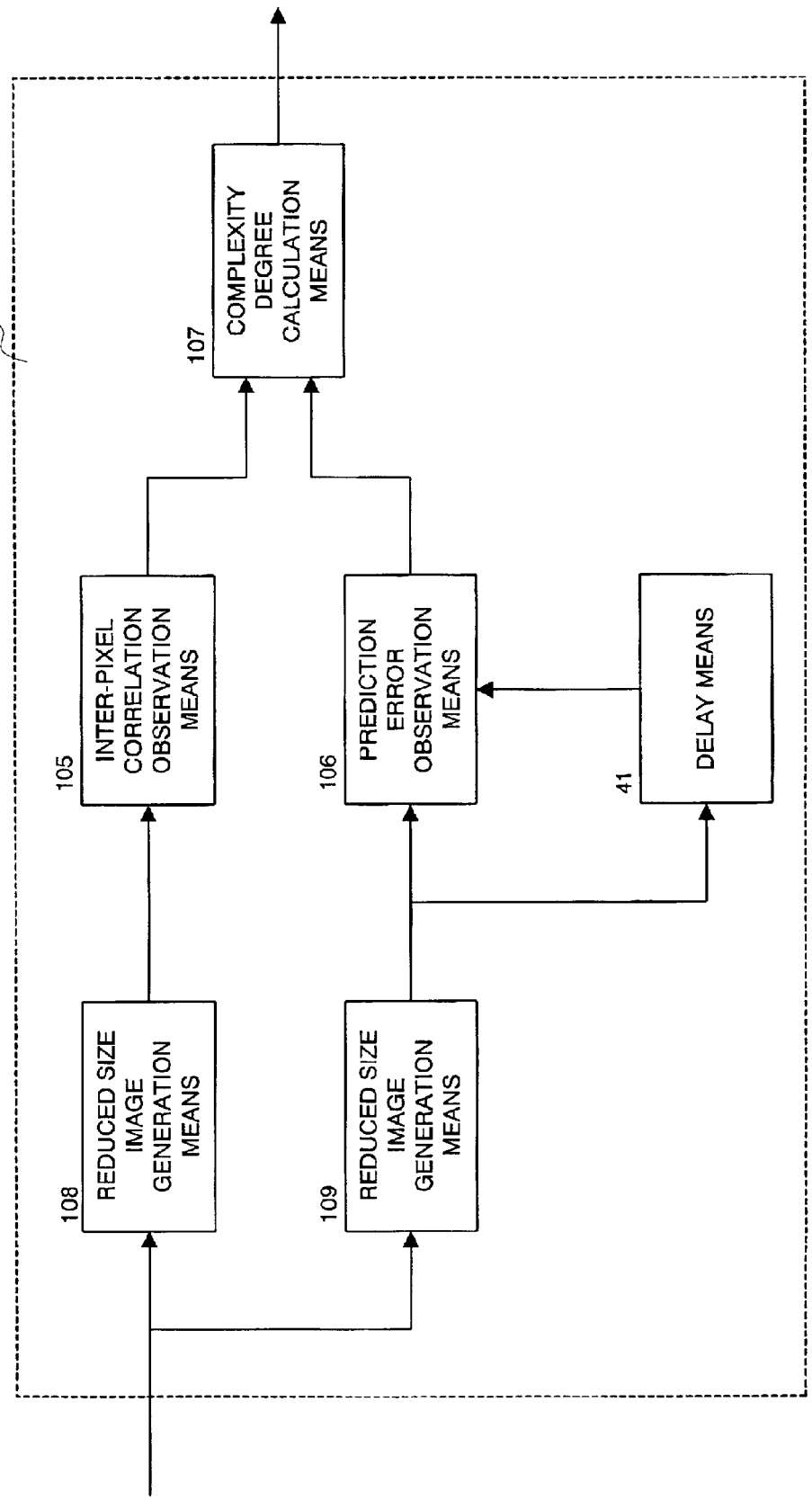
FIG. 19 is a block diagram of pre-analysis means 10.

FIG. 19 is a block diagram of the pre-analysis means 10.

As shown in FIG. 19, the pre-analysis means 10 is configured of the inter-pixel correlation observation means 105, the delay means 41, the inter-frame prediction error observation means 106, the complexity degree calculation means 107, and reduced size image generation means 108 and 109.

The reduced size image generation means 108 and 109 are means for making a low-pass filter for the images that were input to generate the images of which the size is smaller than that of the images input by thinning out the pixels.

Additionally, in the event of using small images with the same size in the inter-pixel correlation and the prediction error calculation, the reduced size image generation means 108 and 109 can be configured to be collected into one body. Furthermore, the image compression may be applied only to one characteristics. For example, only the reduced size image generation means 108 is used, the reduced size image generation means 109 is omitted, and the reduced images may be applied only to the calculation of the inter-pixel correlation, or only the reduced size image generation means 109 is used, the reduced size generation means 108 is omitted, and the reduced images may be applied only to the calculation of the prediction error.

Continually, the operation of the above-mentioned configuration will be explained.

Additionally, in this embodiment, only the reduced size image generation means 108 and 109 were added to the pre-analysis means 10 of the third embodiment, the other configuration than it is similar to that of the first embodiment and the third embodiment, thus only the operation of the reduced size image generation means 108 and 109 is explained, and the explanation of the other operations is omitted.

The reduced size image generation means 108 and 109 make a low-pass filter for the images that were input to generate the images of which the size is smaller than that of the images input by thinning out the pixels. And, the reduced size image generation means 108 transmits the reduced images that were generated to the inter-pixel correlation observation means 105, and the reduced size image generation means 109 transmits the reduced images that were generated to the inter-frame prediction error observation means 106. Hereinafter, the coding of the images is made with a similar operation to that of the first embodiment and the second embodiment.

Additionally, in this embodiment, the reduced images, which were generated, from the reduced size image generation means 108 are transmitted to the inter-pixel correlation observation means 105, and the reduced images, which were generated, from the reduced size image generation means 109 are transmitted to the inter-frame prediction error observation means 106; however the reduced images generated in the reduced size image generation means 108 (or 109) also can be transmitted to both of the inter-pixel correlation observation means 105 and the inter-frame prediction error observation means 106. Or, the reduced images generated in the reduced size image generation means 108 or 109 also can be transmitted only to either the inter-pixel correlation observation means 105 or the inter-frame prediction error observation means 106. For example, the reduced images from the reduced size image generation means 108 are transmitted to the inter-pixel correlation observation means 105, and the normal images may be transmitted to the inter-frame prediction error observation means 106. Or, the reduced images from the reduced size image generation means 109 are transmitted to the inter-frame prediction error observation means 106, and the normal images may be transmitted to the inter-pixel correlation observation means 105.

A fifth embodiment will be explained.

In the third embodiment, the estimation parameters a, b, and c of the complexity degrees were calculated and established from the pre-coded data; however, in this embodiment, the estimation parameters a, b, and c are estimated from the result of having coded the images actually.

At first, a configuration of the moving image coding device will be explained.

In this embodiment, for example, as shown in FIG. 15, the coding for the frames up to the (j−1)-th frame was already finished, the analyzed result and the coded result up to the (j−1)-th frame are utilized to observe the sum A of the absolute value of a difference between the neighboring pixels and the sum E of the absolute value of the prediction error from the analysis result, and to observe the generation code quantity and an average value of the quantization scale used from the coding result. Or, the complexity degrees of the coded images can be calculated from the generation code quantity and the average value of the quantization scale, and the estimation parameters a, b, and c of the complexity degree can be estimated from a relation between this complexity degree and the pre-predicted characteristics. The estimation parameters a, b, and c obtained in such a manner are updated every time the coding is made for each picture type.

Figure 20:
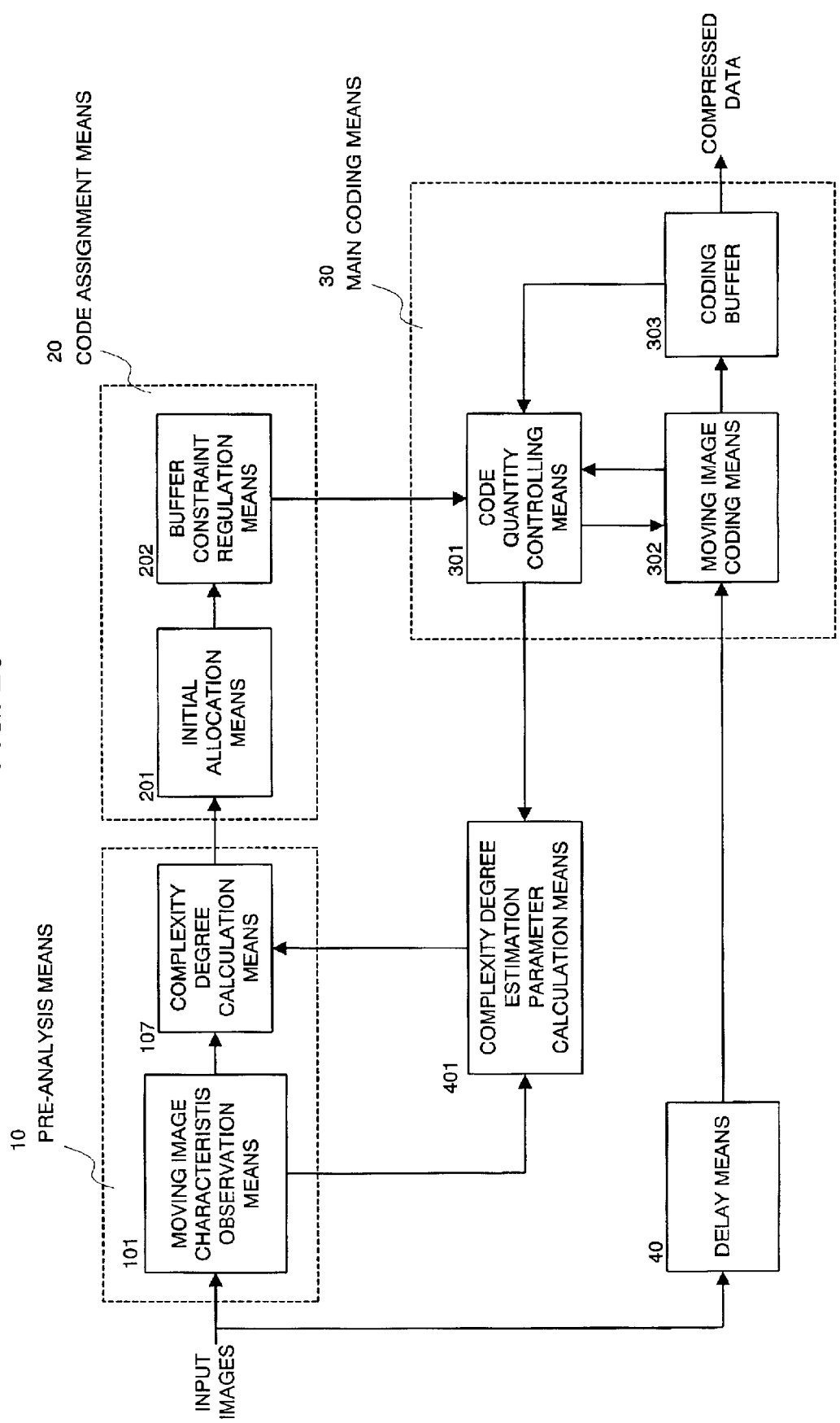
FIG. 20 is a block diagram of a moving image coding device.

FIG. 20 is a block diagram of the moving image coding device.

Additionally, to the similar components to that of the moving image coding devices of the first embodiment and the third embodiment are affixed identical codes, and detailed explanation is omitted.

As shown in FIG. 20, in this embodiment, complexity degree estimation parameter calculation means 401 is provided in addition to the configuration of the first embodiment shown in FIG. 1

The complexity degree estimation parameter calculation means 401 is means for calculating the complexity degrees from the average value of the quantization scale computed from the characteristics of each image observed in the image characteristics observation means 101 and the generation code quantity calculated in the main coding means 30, and for calculating complexity degree estimation parameters from the complexity degrees of the images that correspond to the characteristics of the images. And, the calculated complexity degree estimation parameters are transmitted to the complexity degree calculation means 107.

Continually, the operation of the above-mentioned configuration will be explained.

Figure 21:
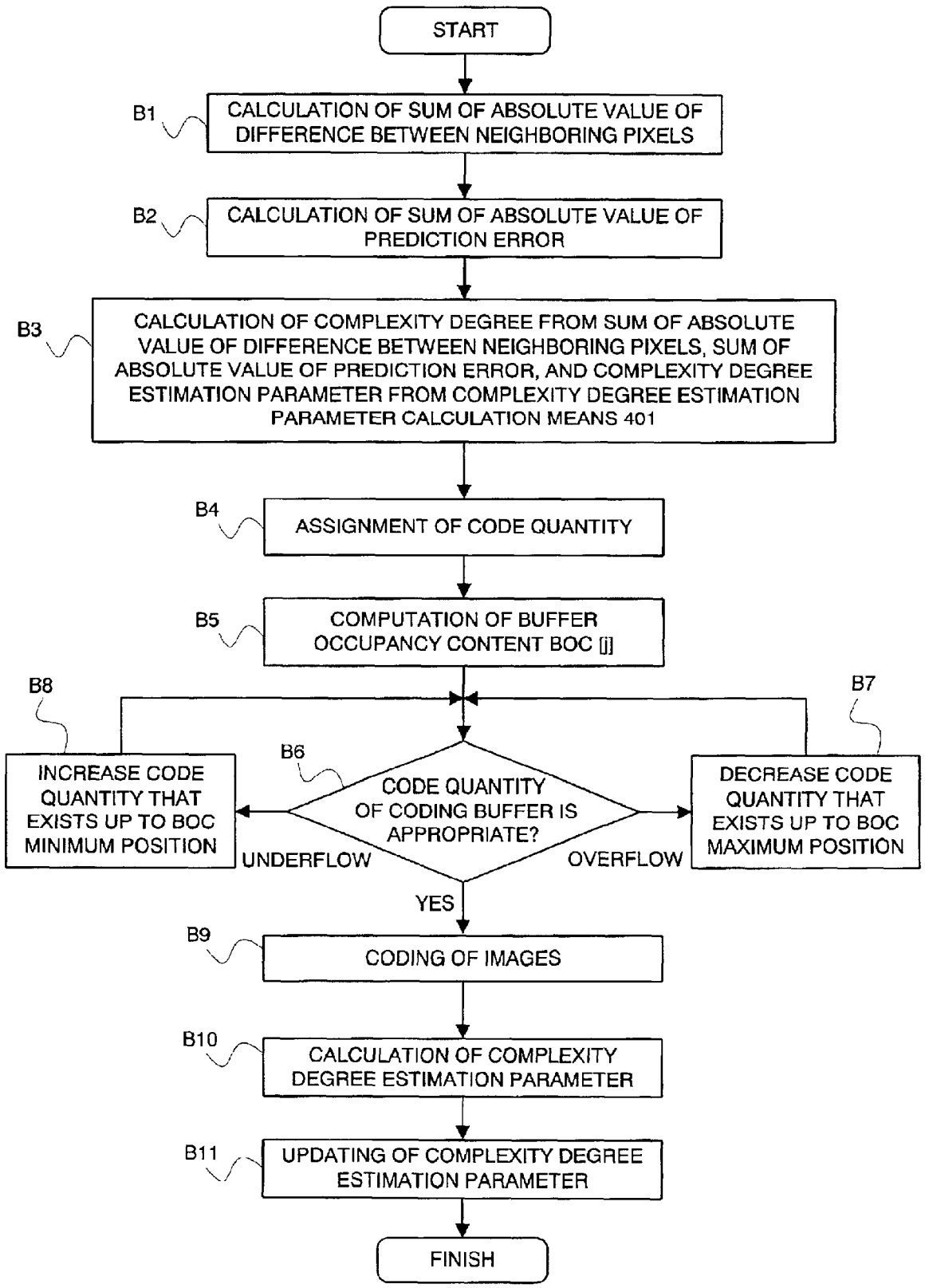
FIG. 21 is a flowchart for explaining an operation of this embodiment.

FIG. 21 is a flowchart for explaining the operation of this embodiment.

Additionally, the operation of calculating the absolute value of a difference between the neighboring pixels and the sum of the absolute value of the prediction error was already explained in the third embodiment, and the operation of measuring the generation code quantity in the main coding means 30 was already explained in the first embodiment, thus detailed explanation is omitted in this embodiment. Also, so as to make explanation easy, for example, as shown in FIG. 15, the coding was already finished up to the (j−1)-th frame, assuming that the analyzed result and encoded result up to the (j−1)-th frame can be utilized, the number of the frame, in which the images (moving images) that were input by the time that the frame j was coded can be analyzed, is set at La, and the frame number, which exists in the assignment interval of the code quantity, at Lb.

The moving image characteristics observation means 101 calculates a correlation between the neighboring pixels within the frame of the images that were input (Step B1), and further calculates a difference between the input image and the prediction image (Step B2).

The complexity degree calculation means 107 calculates the complexity degrees, based on the sum of the absolute value of a difference between the neighboring pixels, the sum of the absolute value of the prediction error calculated in the moving image characteristics observation means 101, and the complexity degree estimation parameters transmitted from the complexity degree estimation parameter calculation means 401 (Step B3).

The code assignment means 20 makes the assignment of the code quantity for the assignment interval (Step B4).

The buffer constraint regulation means 202 calculates the buffer occupancy in the coding buffer of the assigned code quantity (Step B5).

The buffer constraint regulation means 202 determines whether or not the coding buffer gives rise to the overflow or the underflow, based on the calculated buffer occupancy (Step B6).

In the event that the coding buffer gives rise to the overflow, the buffer constraint regulation means 202 regulates the code quantity so that the coding buffer does not give rise to the overflow (Step B7).

On the other hand, in the event that the coding buffer gives rise to the underflow, the buffer constraint regulation means 202 regulates the code quantity so that the coding buffer does not give rise to the underflow (Step B8).

In the event that the assignment became the assignment with which neither the overflow nor underflow occurred in the coding buffer, the main coding means 30 makes the coding for the images delayed in the delay means 40 (Step B9).

The complexity degree estimation parameter calculation means 401 calculates the complexity degree estimation parameters, based on the generation code quantity and the quantization scale generated in coding the frames in the moving image coding means 302, and the sum of the absolute value of a difference between the neighbors and the sum of the absolute value of the prediction error calculated in the moving image characteristics observation means 101. For example, the generation code quantity and the quantization scale generated in coding the frames in the moving image coding means 302 was set at S[j] and Q[j] respectively, the sum of the absolute value of a difference between the neighbors calculated in the moving image characteristics observation means 101 at A[j], the sum of the absolute value of the prediction error at E[j], and the complexity degree estimation parameters of the I picture, the P picture, and the B picture at a, b, and c respectively, the complexity degree X[j] that is computed from the generation code quantity S[j] and the quantization scale Q[j] is calculated as $$X[j]=S[j]*Q[j]$$

and respective complexity degrees Xi[j], Xp[j], and Xb[j] of the I picture, the P picture, and the B picture are calculated as $$Xi[j]=a*A[j]$$

$$Xp[j]=b*E[j]$$

$$Xb[j]=c*E[j].$$

And, from the fact that the complexity degree computed with the generation code quantity and the quantization scale has an approximate relation with the complexity degree computed from the sum of the absolute value of a difference between the neighbors and the sum of the absolute value of the prediction error, the complexity degree estimation parameters a, b, and c are calculated respectively as $$a=(S[j]*Q[j])/A[j]$$

$$b=(S[j]*Q[j])/E[j]$$

$$C=(S[j]*Q[j])/E[j]$$

And, the computed complexity degree estimation parameters are transmitted to the complexity degree calculation means 107 (Step B10).

The complexity degree calculation means 107 updates the complexity degree estimation parameters, which were used at first, into the complexity degree estimation parameters transmitted from the complexity degree estimation parameter calculation means 401, and hereinafter, uses them for calculation of the complexity degrees of the images (Step B11).

A sixth embodiment will be explained.

The above-mentioned moving image coding device of the first embodiment also may be adapted so that it is realized with the computer control such as a digital process processor.

Figure 22:
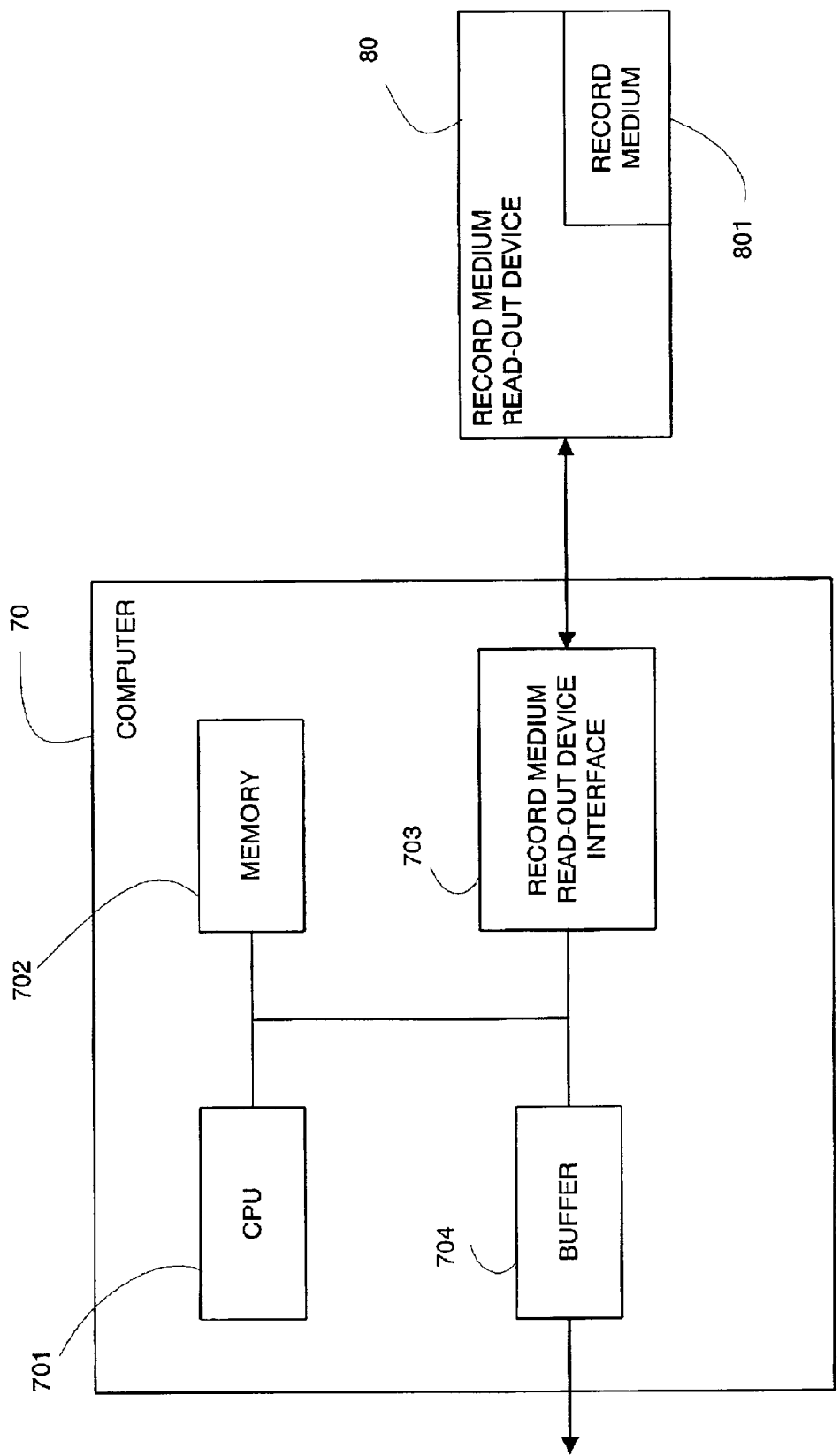
FIG. 22 is a block diagram illustrating a device configuration schematically of the event of realizing a moving image coding device with a computer.

FIG. 22 is a block diagram illustrating a device configuration schematically in the event of realizing a moving image coding device with a computer.

At first, the configuration for realizing this embodiment will be explained.

704 is a buffer. The buffer 704 is a buffer that accumulates the coded data and outputs it at the fixed bit rate. The fluctuation of the generation code quantity of each image is absorbed by this buffer.

70 is a computer. The computer 70 is a computer that reads out a program from a record medium 801 via a record medium read-out device 80 and a record medium read-out device interface 703 into a memory 702, and executes it with a CPU (Central Processing Unit).

801 is a record medium. In the record medium 801 was recorded a program for executing the following processes (1) to (7), that is, the processes of: (1) observing the generation code quantity and the average quantization scale from the input images; (2) calculating the complexity degrees, based on the generation code quantity and the average quantization scale that were observed; (3) determining whether or not the image is a multiple of N (Integer) of a unit interval by which the coding is made; (4) calculating the total code quantity of the assignment interval; (5) calculating the target code quantity; (6) regulating so that the assigned code quantity does not violate the constraint of the buffer; and (7) coding the images.

The above-mentioned program may be stored in non-volatile memories such as a mask ROM and so forth, and a flash memory and so forth, and the record medium not only includes the non-volatile memory but also a communication medium and so forth that are communicated by wire or wireless, which carries the program, for example, in the event of making a communication medium transfer for the above program with the computer, for example from a server device, and so forth, in addition to the media such as a CD-ROM, an FD, a DVD (Digital Versatile Disk), an Mt (Magnetic tape), a carrier-type HDD and so forth.

Next, the operation of the process described above will be explained.

Figure 23:
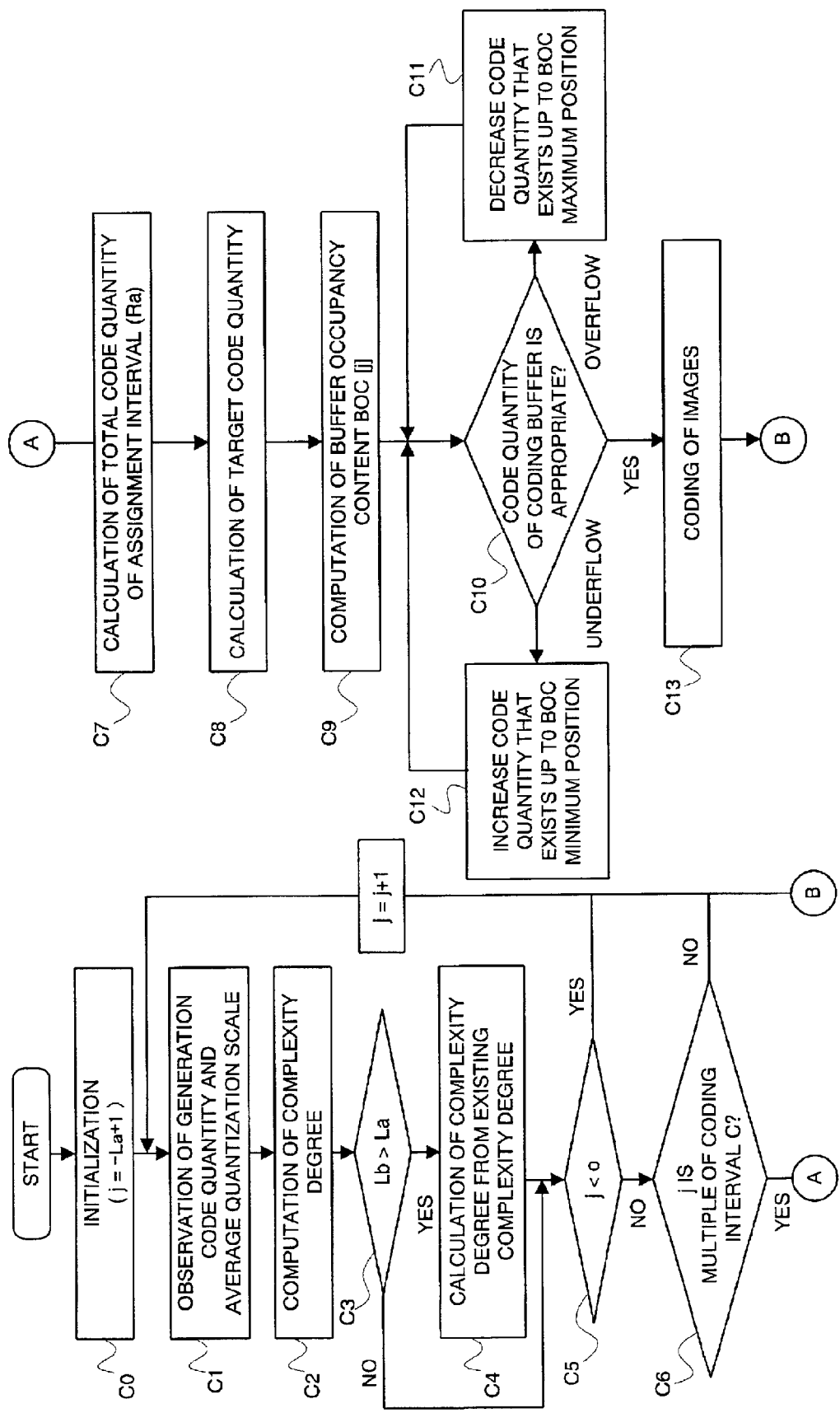
FIG. 23 is a flowchart for explaining an operation of this embodiment.

FIG. 23 is a flowchart for explaining the operation of this embodiment.

Additionally, so as to make explanation of the operation easy, the number of the frame in which the images that were input by the time that the frame j was coded can be analyzed, is set at La, and the number of the frame, which exists in the interval (hereinafter, referred to as a assignment interval) in which the assignment of the code quantity is made, at Lb.

No. j of the frame into which the images were input is initialized as −La+1 (Step C0), and the generation code quantity and the average quantization scale are observed in the event of having coded the frames (Step C1).

The complexity degree is calculated based on the generation code quantity and the average quantization scale of the image. For example, in the event that the generation code quantity of the frame j+La−1 was set at S [j+La−1] and the average quantization scale at Q $[j+La-1]$, the complexity degree X $[j+La-1]$ is calculated as $$X[j+La-1]=S[j+La-1]*Q[j+La-1]$$

(Step C2).

The number La of the frame, in which the images can be analyzed, is compared with the number Lb of the frame that exists in the assignment interval of the code quantity (Step C3).

In the event that the number Lb of the frame is larger than the number La of the frame in which the images can be analyzed (Lb>La), the complexity degree of the part that does not reach the assignment interval is calculated from the complexity degrees of the images that were already analyzed. For example, three kinds of pictures, I picture, P picture, and B picture, for use in the MPEG 1 or the MPEG 2 are employed, the symbols in the upper side of FIG. 11 are set to indicate the picture type and the frame number, the symbols in the lower side to indicate the complexity degrees of the pictures, as shown in FIG. 11, the size N of the GOP is 15, which is set at assignment interval length Lb, the analysis interval length L is 8, which becomes La, the head of the GOP is I picture, I or P pictures are arranged every three pictures, the other pictures than these are set at B picture, and in the event that the pictures ranging from I0 to B11 were already analyzed, the complexity degrees X' that corresponds to 7 pictures, P12 to P18, for which the complexity degree was not calculated, are calculated by the use of the average value or the latest value of each picture type, which becomes $$X'15=Xi=X0$$

$$X'12=X'18=Xp=(X6+X9)/2$$

$$X'13=X'14=X'16=X'17=Xb=(X4+X5+X7+X8+X10+X11)/6.$$

Additionally, in the event that the same picture type does not exist for a period during which the images were analyzed, the complexity of the same picture type analyzed of late is set at the degree of this event (Step C4).

On the other hand, in the event that the number Lb of the frame that exists in the assignment interval of the code quantity is less than the number La of the frame in which the images can be analyzed (Lb$\leq$La), it is unnecessary to predict the complexity degrees, whereby the sequence proceeds to the next step.

It is determined whether or not the frame j into which the images were input reaches the frame number La (Step 5C).

In the event that the number of the frame into which the images were input is below the frame number La (that is, in the event that the frame no. j of the images, which was initialized as −La+1, is j<0), the value of j is increased to calculate the complexity degrees of the next images (Step C1, C2, C3, and C4).

On the other hand, in the event that the number of the frame of the images that were input became the same as the frame number La (j=0), it is determined whether or not the frame j is a multiple of N (Integer) of a unit interval C in which the coding process is performed (Step C6).

In the event that the frame j is not a multiple of N (Integer) of the unit interval C in which the coding process is performed, the value of j is increased to calculate the complexity degrees of the next images (Step C1, C2, C3, and C4).

On the other hand, in the event that the frame j is a multiple of N (Integer) of the unit interval C in which the coding process is performed, the assignment of the code quantity is made for the assignment interval.

At first, the total code quantity within the assignment interval is calculated. For example, in the event that the assignment interval of the code quantity was set at L frame and the total code quantity that was able to be assigned to the frames ranging from the j-th frame to the (j+L−1)-th was set at Ra[j], the total code quantity Ra[j] of (a) the event that a relation between the frame L and the GOP is such that the assignment unit of the code quantity is the GOP unit (the frame L is a multiple of N (Integer) of the GOP) is different from that of (b) the event that a relation is such that the assignment unit of the code quantity is not the GOP unit (the frame L is not a multiple of N (Integer) of the GOP), and in (a) the event that the assignment unit of the code quantity is the GOP unit (the frame L is a multiple of N (Integer) of the GOP), Ra[j] is calculated as $$Ra[j]=R/\text{frame\_rate}*L$$

Additionally, R is a bit rate for use in the main coding. Also, in consideration of the buffer occupancy BOC[j], it is also possible to regulate the total code quantity. For example, Ra[j] is calculated as $$Ra[j]=R/\text{frame\_rate}*L-BOC[j]$$

In (b) the event that the assignment unit of the code quantity is not the GOP unit (the frame L is not a multiple of N (Integer) of the GOP), Ra [j] is calculated as $$Ra[j]=R/\text{frame\_rate}*L-S\text{sum}.$$

Herein, in the event that the frame number within one GOP is N, $S_{sum}$ is the summation of the generation code quantity in (N-L) frame (s) in which the coding was made just before (Step C7).

Next, the target code quantity of each frame is calculated.

By making proportional allocation for the total code quantity Ra[j], which can be assigned to the assignment interval of the code quantity, with the complexity degree X[j], the target code quantity T[j] of each frame is calculated as $$T[j]=X[j]/X\text{sum}*Ra[j]$$

$$Xsum = \sum_{k=j}^{j+L-1} X[k].$$

Additionally, $X_{sum}$ indicates the summation of the complexity degrees in the assignment interval. Herein, the target code quantity T[j] is calculated for respective frames ranging from the frame j to the frame j+L−1 (Step C8).

The buffer occupancy is calculated. For example, in the event that the buffer occupancy is set at BOC, the buffer occupancy BOC is calculated as $$BOC[j]=BOC[j-1]+T[j]-R\text{frame}.$$

Herein, Rframe is the code quantity for a frame that was calculated from the bit rate R for use in the main coding, which is $$R\text{frame}=R/\text{frame\_rate}.$$

Herein, an initial value of the buffer occupancy is set at 0 (zero) (BOC[0]=0) (Step C9).

It is determined whether or not the buffer gives rise to the overflow or the underflow, based on the calculated buffer occupancy. For example, in the event that the upper limit of the buffer was set at B, it is determined whether or not the buffer occupancy BOC [j] is smaller than B-Rframe (Step C10).

In the event that the buffer gave rise to the overflow, the code quantity is regulated so that the buffer does not give rise to the overflow. For example, as shown in FIG. 4(a), the assignment of the code became the assignment whereby the buffer gave rise to the overflow, the frame jo in which the occupancy of the code quantity of the buffer became maximum is detected, and as with the code quantity assigned to the frames ranging from the frame j to the jo, as shown in FIG. 4(b), the assignment of its code quantity is decreased so that the buffer does not give rise to the overflow in jo. And, the decreased portion's code quantity is assigned to the frames, jo+1 to j+L−1 (Step C11).

On the other hand, in the event that the buffer gave rise to the underflow, the code quantity is regulated so that the coding buffer does not give rise to the underflow. For example, as shown in FIG. 5(a), the assignment of the code became the assignment whereby the buffer gave rise to the underflow, the frame ju in which the occupancy of the code quantity of the buffer became minimum is detected, and as with the code quantity assigned to the frames ranging from the frame j to the ju, as shown in FIG. 5(b), its assignment is increased so that the buffer does not give rise to the underflow in ju. And, the increased portion's code quantity is subtracted from the code quantity assigned to the frames, ju+1 to j+L−1 (Step C12).

Furthermore, in the event that the assignment of the code became the assignment whereby the buffer does not give rise to either the overflow or the underflow, the coding is made for the frames j to j+c−1 (Step C13).

Additionally, in the event that the unit interval C in which the coding process is performed is 1, the Step C6 can be omitted. In the event that La and Lb are the fixed values, the Step C3 is omitted, and the Step C4 is always executed, or it is also possible that the Step C4 is not constantly executed (both of the Step C3 and the Step C4 are omitted). Also, the frame number La in the analysis interval, the frame number Lb that exists in the assignment interval, and the coding interval C do not always need to be the same, which are not limited to the combination described here.

A seventh embodiment will be explained.

The above-mentioned moving image coding device of the second embodiment may be adapted so that it is realized with the computer control such as a digital signal process processor. Additionally, identical codes are affixed to the similar components to that of the sixth embodiment, and detailed explanation is omitted.

In the computer 70 that executes the program read out from the record medium 801, in executing the coding process of regulating the code quantity so as to match the images, which were input, to the buffer size, in the record medium 801 was recorded the program for executing the following processes, that is, the processes of: (1) observing the generation code quantity and the average quantization scale from the images that were input; (2) storing observation information of the observed images in the record medium 804; (3) calculating the target code quantity; (4) regulating so that the assigned code quantity does not violate the constraint of the buffer; (5) storing said determined data in the record medium 801; and (6) coding the images based on said data.

The above program is read out from the record medium 801 into the memory 702 via the record medium read-out device 80 and the record medium read-out device interface 703, and is executed by a CPU 701.

Continually, the operation in the above-mentioned configuration will be explained.

Additionally, assume that, in this embodiment, the entirety of the sequence of the images that were input is already-known beforehand, the frame number is also finite, and its number is known.

The computer 70 analyzes the entirety of the images, which were input, at a time to store the analysis data in the record medium 801, as shown in FIG. 17. And the computer 70 makes the assignment of the code quantity, based on the analysis data stored in the record medium 801, the designated bit rate, and the buffer size of the buffer 704, calculates the target code quantity of each frame in the entirety of the images that were input, and stores the control data based on this in the record medium 801. Furthermore, the computer 70 generates the compressed data with the coding process of the images, based on the images, which were input, and the control data stored in the record medium 801.

An eighth embodiment will be explained.

The above-mentioned moving image coding device of the third embodiment may be adapted so that it is realized with the computer control such as a digital signal process processor. Additionally, in this embodiment, only the processes (1) to (3) of the sixth embodiment are different, the other processes than these are same as that of the sixth embodiment, and thus the explanation of the other processes is omitted. Also, identical codes are affixed to the similar components to that of the sixth embodiment, and detailed explanation is omitted.

In the computer 70 that executes the program read out from the record medium 801, in executing the coding process of regulating the code quantity so as to match the images, which were input, to the buffer size, in the record medium 801 was recorded the program for executing the following processes, that is, the processes of: (1) calculating the sum of a correlation value between the neighboring pixels within the frame of the input images; (2) calculating the sum of the absolute value of the prediction error from the input image and the prediction image; and (3) calculating the complexity degree from the sum of the correlation value between the neighboring pixels and the sum of the absolute value of the prediction error.

The above program is read out from the record medium 801 into the memory 702 via the record medium read-out device 80 and the record medium read-out device interface 703, and is executed by the CPU 701.

Continually, the operation in the above-mentioned configuration will be explained.

Additionally, in this embodiment, only the operation of the pre-analysis in the sixth embodiment is different, the other operations than this are same as that of the sixth embodiment, thus only the operation of the pre-analysis is explained, and the explanation of the other operations is omitted.

The computer 70 calculates a correlation between neighboring pixels within the frame of the images that were input. For example, the sum A of the absolute value of a difference between neighboring pixels shown in the following equation is calculated.

$$A = \sum_{x=1}^{H-1} \sum_{y=1}^{V} |I(x, y) - I(x+1, y)| + \sum_{x=1}^{H} \sum_{y=1}^{V-1} |I(x, y) - I(x, y+1)|$$

where I(x, y) is a pixel value at a position (x, y) of the image, H and V indicate a horizontal and a vertical frame sizes respectively.

And, the computer 70 generates the prediction image from the images that were input to calculate a difference between the input image and the prediction image. For example, the sum E of the absolute value of the prediction error of the input image and the prediction image shown in the following equation is calculated.

$$E = \sum_{x=1}^{H} \sum_{y=1}^{V} |I(x, y) - P(x, y)|$$

where P(x, y) is a pixel value at a position (x, y) of the prediction image.

Or, the sum-square of the prediction error shown in the following equation is calculated.

$$E = \sum_{x=1}^{H} \sum_{y=1}^{V} (I(x, y) - P(x, y))^2$$

Further, the computer 70 calculates the complexity degrees, based on the sum A of the absolute value of a difference between neighboring pixels and the sum E of the absolute value of the prediction error. For example, in the event that the complexity degree of the I picture was set at Xi, the complexity degree of the P picture at Xp, and the complexity degree of the B picture at Xb, it is known that there is a correlation between the calculated characteristics and the complexity degree, whereby Xi, Xp, and Xb can be estimated as $Xi=a*A$ $Xp=b*E$ $Xb=c*E.$ Herein, a, b, and c are parameters for estimating the complexity degrees, these values are calculated and established from the result of having coded the already-known data beforehand, and the complexity degree X[j] of the frame j is calculated from the characteristics A[j] and E[j] of the frame j by the use of the above-mentioned equation as $X[j]=a*A[j]$ in the case of the I picture, $X[j]=b*E[j]$ in the case of the P picture, and $X[j]=c*E[j]$ in the case of the B picture. Hereinafter, the coding of the images is made with a similar operation to that of the first embodiment.

A ninth embodiment will be explained.

The above-mentioned moving image coding device of the fourth embodiment may be adapted so that it is realized with the computer control such as a digital signal process processor. Additionally, this embodiment is configured by adding the process (1) to the eighth embodiment, the other processes than it are same as that of the sixth embodiment and the eighth embodiment, and thus the explanation of the other processes is omitted. Also, identical codes are affixed to the similar components to that of the sixth embodiment, and detailed explanation is omitted.

In the computer 70 that executes the program read out from the record medium 801, in executing the coding process of regulating the code quantity so as to match the images, which were input, to the buffer size, in the record medium 801 was recorded the program for executing the process of (1) thinning out the pixels of the images that were input to generate the images of which the size is smaller than the original one.

The above program is read out from the record medium 801 into the memory 702 via the record medium read-out device 80 and the record medium read-out device interface 703, and is executed by the CPU 701.

Continually, the operation of the above-mentioned process will be explained.

Additionally, in this embodiment, only the operation of reducing the images was added to the pre-analysis of the eight embodiment, the other operations than this are same as that of the sixth embodiment and the eighth embodiment, and thus the explanation of the other operations is omitted.

The images of which the size is smaller than the size of the images that were input by thinning out the pixels of the images input into the computer 70 are generated.

Hereinafter, the coding of the images is made with the similar operation to that of the sixth embodiment and the eighth embodiment.

Additionally, in this embodiment, the process was explained of computing the sum of the absolute value of a difference between the neighboring pixels and the sum of the absolute value of the prediction error from the reduced images; however either of the sum of the absolute value of a difference between the neighboring pixels and the sum of the absolute value of the prediction error is computed from the reduced images, and the other may be computed from the normal image. For example, in the event that the sum of the absolute value of a difference between the neighboring pixels was computed from the reduced images, the sum of the absolute value of the prediction error may be computed from the normal image, or in the event that the sum of the absolute value of the prediction error was computed from the reduced images, the sum of the absolute value of a difference between the neighboring pixels may be computed from the normal image.

A tenth embodiment will be explained.

The above-mentioned moving image coding device of the fifth embodiment may be adapted so that it is realized with the computer control such as a digital signal process processor. Additionally, identical codes are affixed to the similar components to that of the sixth embodiment, and detailed explanation is omitted.

In this embodiment, the process of estimating the complexity degree estimation parameter was added to the sixth embodiment and the eighth embodiment.

In the computer 70 that executes the program read out from the record medium 801, in executing the coding process of regulating the code quantity so as to match the input images to the buffer size, in the record medium 801 was recorded the program for executing the following processes, that is, the processes of: (1) calculating the sum of a correlation value between the neighboring pixels within the frame of the images that were input; (2) calculating the sum of the absolute value of the prediction error from the input images and the prediction images; and (3) calculating the complexity degrees from a correlation value between the neighboring pixels, the sum of the absolute value of the prediction error, and the complexity degree estimation parameter; (4) calculating the target code quantity; (5) regulating so that the assigned code quantity does not violate the constraint of the buffer; (6) coding the images; (7) calculating the complexity degree estimation parameters from the characteristics, the generation code quantity, and the average value of the quantization scale; and (8) updating the complexity degree estimation parameters used in calculating the complexity degrees into the complexity degree estimation parameters calculated in the process (6).

The above program is read out from the record medium 801 into the memory 702 via the record medium read-out device 80 and the record medium read-out device interface 703, and is executed by the CPU 701.

Continually, the operation in the above-mentioned configuration will be explained.

Figure 24:
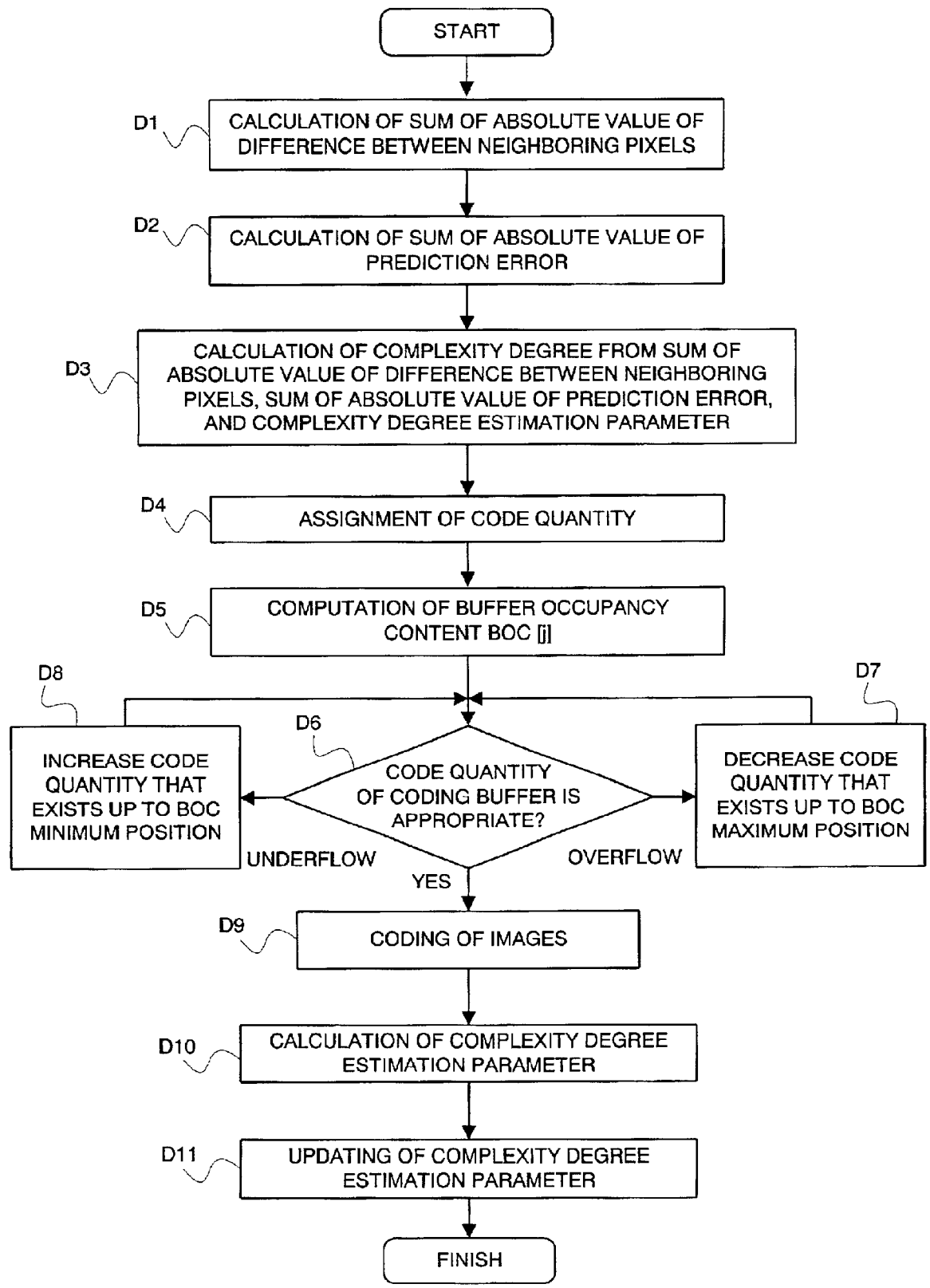
FIG. 24 is a flowchart for explaining an operation of this embodiment.
Figure 25:
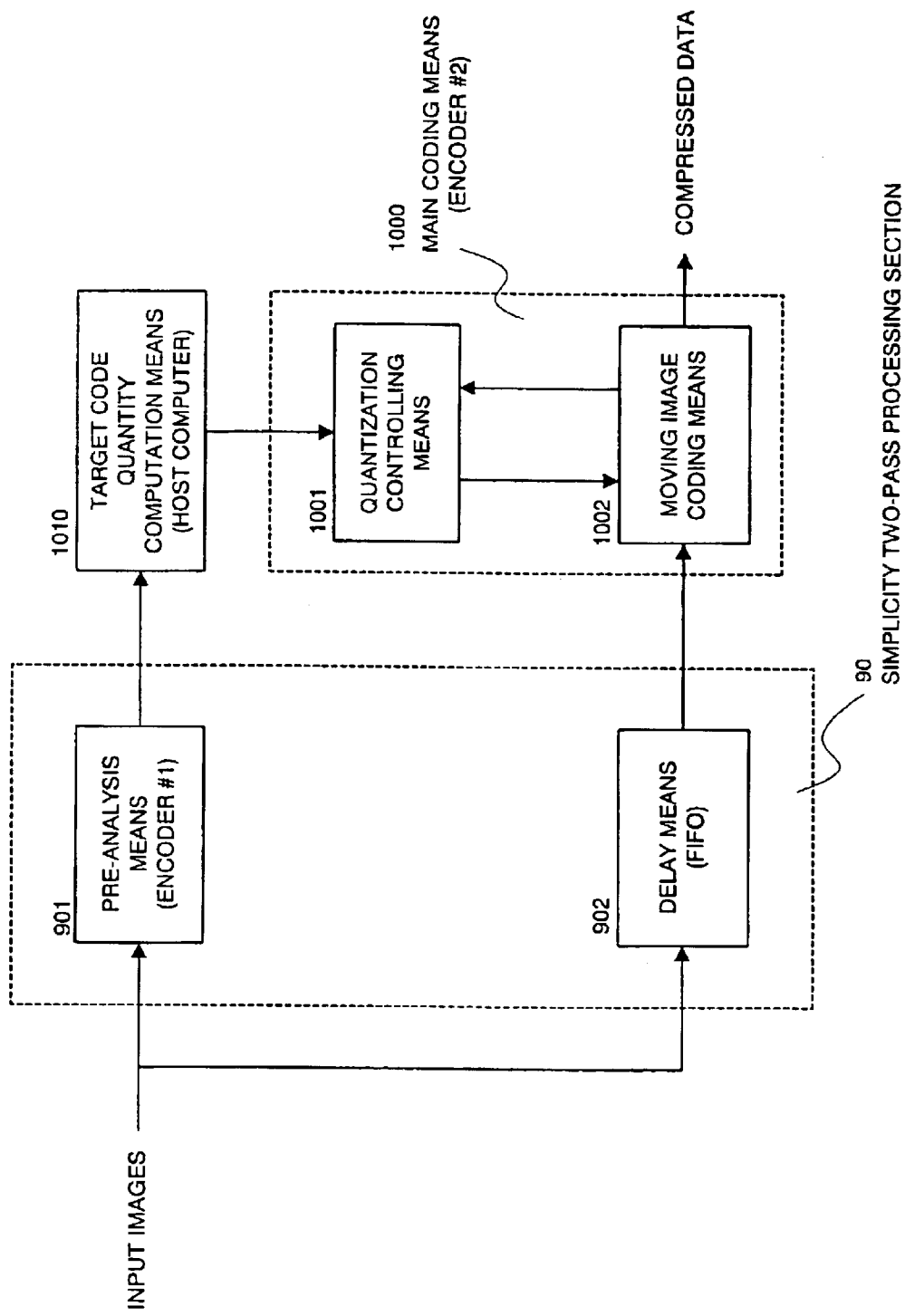
FIG. 25 is a block diagram for explaining a configuration of a moving image coding device.
Figure 26:
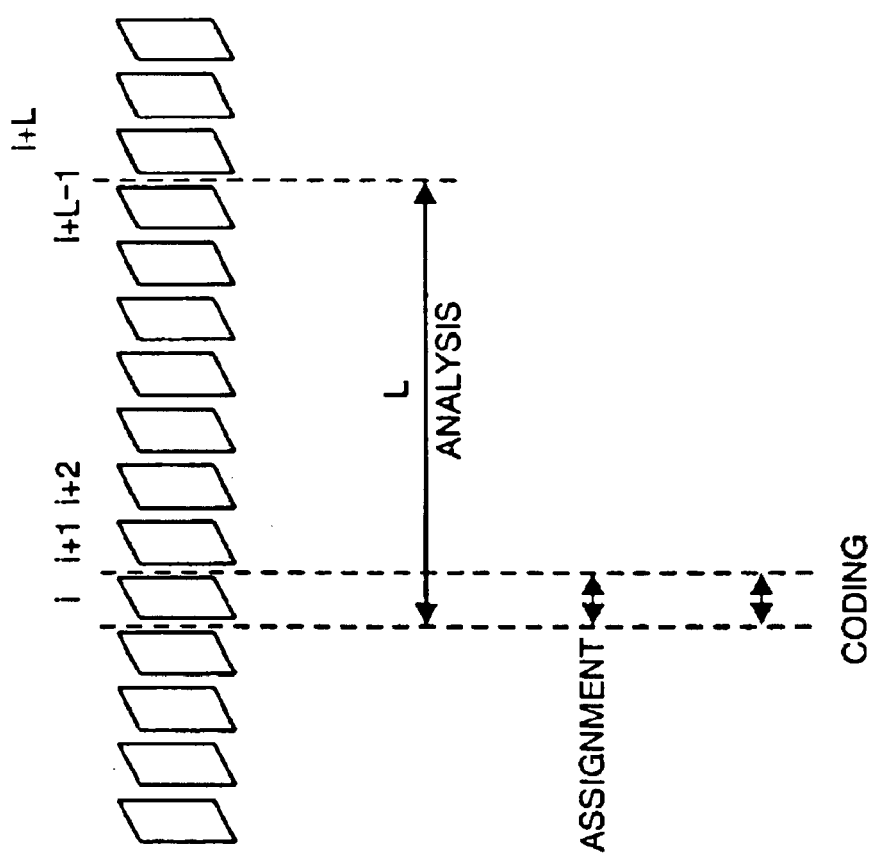
FIG. 26 is a block diagram for explaining an operation of a moving image coding device.

FIG. 24 is a flowchart for explaining the operation of this embodiment.

Additionally, the operation of calculating the absolute value of a difference between the neighboring pixels and the sum of the absolute value of the prediction error was already explained in the eighth embodiment, and the operation of measuring the generation code quantity was already explained in the sixth embodiment, thus detailed explanation is omitted in this embodiment. Also, so as to make the explanation easy, for example, as shown in FIG. 15, the coding was already finished up to the (j−1)-th frame, assuming that the analyzed result and encoded result up to the (j−1)-th frame can be utilized, the number of the frame, in which the images that were input by the time that the frame j was coded can be analyzed, is set at La, and the frame number, which exists in the assignment interval of the code quantity, at Lb.

The computer 70 calculates a correlation between the neighboring pixels within the frame of the images that were input (Step D1), and calculates a difference between the input image and the prediction image (Step D2). And, the complexity degrees are calculated based on the sum of the absolute value of a difference between the neighboring pixels, the sum of the absolute value of the prediction error, and the complexity degree estimation parameters (Step D3).

The computer 70 makes the assignment of the code quantity for the assignment interval (Step D4), calculates the buffer occupancy in the coding buffer of the assigned code quantity (Step D5), and determines whether or not the coding buffer gives rise to the overflow or the underflow (Step D6).

And, in the event that the coding buffer gives rise to the overflow, the computer 70 regulates the code quantity so that the coding buffer does not give rise to the overflow (Step D7), in the event that the coding buffer gives rise to the underflow, it regulates the code quantity so that the coding buffer does not give rise to the underflow (Step D8).

Further, in the event that the assignment became the assignment with which the coding buffer gave rise to neither the overflow nor underflow, the computer 70 makes the coding the images (Step D9).

The computer 70 calculates the complexity degree estimation parameters, based on the generation code quantity and the quantization scale generated in coding the frames, the sum of the absolute value of a difference between the neighboring pixels, and the sum of the absolute value of the prediction error. For example, the generation code quantity was set at S[j], the quantization at Q[j], the sum of the absolute value of a difference between the neighbors at A[j], the sum of the absolute value of the prediction error at E[j], and the complexity degree estimation parameters of the I picture, the P picture, and the B picture at a, b, and c respectively, the complexity degree X[j] that is computed from the generation code quantity S[j] and the quantization scale Q[j] is calculated as $$X[j]=S[j]*Q[j]$$

and the complexity degrees Xi[j], Xp[j], and Xb[j] of the I picture, the P picture, and the B picture are calculated respectively as $$Xi[j]=a*A[j]$$

$$Xp[j]=b*E[j]$$

$$Xb[j]=c*E[j]$$

And, from the fact that the complexity degree computed with the generation code quantity and the quantization scale has an approximate relation with the complexity degree computed from the absolute value of a difference between the neighboring pixels and the sum of the absolute value of the prediction error, the complexity degree estimation parameters a, b, and c are calculated respectively as $$a=(S[j]*Q[j])/A[j]$$

$$b=(S[j]*Q[j])/E[j]$$

$$c=(S[j]*Q[j])/E[j]$$

(Step D10).

And, the computer 70 updates the complexity degree estimation parameters used at first into the complexity degree estimation parameters calculated newly, and, hereinafter, uses them for calculation of the complexity degrees of the images (Step D11).

The effect of the present invention lies in improvement in the image quality under the same bit rate by making the suitable code quantity for the buffer.

The reason is because: the assignment of the code quantity is made for a plurality of the images simultaneously, based on information of the pre-analysis of the images; a transition of the buffer is predicted based on it to regulate so as not to give rise to the buffer constraint violation; and the assignment of the code quantity, which observed the buffer constraint beforehand, becomes possible. Also, the reason is because the control can be taken so that the code quantity, which is generated in making the actual coding, approaches the target code quantity, and the allocation of the code quantity that corresponded to the complexity of the images can be realized.

The entire disclosure of Japanese Application No. 2001-024322 filed on Jan. 31, 2001 including specification, claims, drawings and summary are incorporated herein by reference in its entirely.

What is claimed is:

1. A moving image coding device that makes a compression and coding for moving images, said image coding device comprising:

means for analyzing images, which exist in a constant interval, to observe characteristics of each image;

based on said observed characteristics, means for estimating complexity degrees of said images;

means for pre-allocating a code quantity to said constant interval, and computing a target code quantity with which said pre-allocated code quantity is assigned to each image for all images within said constant interval based on said estimated complexity degrees;

a buffer which accumulates a code that is generated as a result of having coded said images;

when said computed target code quantity is assigned to each of said images, means for predicting a transition of occupancy in said buffer of said accumulated code with said computed target code quantity and regulating said target code quantity so that the predicted transition of the buffer occupancy does not give rise to an overflow or an underflow; and means for making a compression and coding for said images according to said regulated target code quantity.

2. The image coding device according to claim 1, wherein said means for estimating complexity degrees of said images is configured so as to estimate complexity degrees of said images, based on statistics of said analyzed images.

3. The image coding device according to claim 1, wherein said means for estimating complexity degrees of said images is configured so as to predict complexity degrees of said images, based on said complexity degrees of said images that were already analyzed.

4. The image coding device according to claim 1, wherein, in coding said images, which were input, with a predetermined coding method, said means for analyzing is configured so as to observe code quantity, which are generated in coding said images and a value of a quantization scale used.

5. The image coding device according to claim 1, wherein said means for analyzing is configured so that in an event of making an intra-frame coding for said images that were input, a correlation is observed between neighboring pixels within a frame of said images; and in an event of making an inter-frame predictive coding for said images that were input, inter-frame prediction error quantity of said images that were input is observed.

6. The image coding device according to claim 1, further comprising means for reducing the size of said images that were input; and wherein, said means for analyzing is configured so that in an event of making an intra-frame coding for said images that were input, a correlation is observed between neighboring pixels within a frame of said images that were input; and in an event of making an inter-frame predictive coding for said images that were input, inter-frame prediction error quantity of said size reduced images is observed.

7. The image coding device according to claim 1, further comprising means for reducing the size of said images that were input, and wherein said means for analyzing is configured so that in an event of making an intra-frame coding for said images that were input, a correlation is observed between neighboring pixels within a frame of said reduced images; and in an event of making an inter-frame predictive coding for said images that were input, inter-frame prediction error quantity of said images that were input is observed.

8. The image coding device according to claim 1, further comprising means for reducing the size of said images that were input, and wherein said means for analyzing is configured so that in an event of making an intra-frame coding for said images that were input, a correlation is observed between neighboring pixels within a frame of said reduced images; and in an event of making an inter-frame predictive coding for said images that were input, inter-frame prediction error quantity of said size reduced images is observed.

9. The image coding device according to claim 1, wherein said means for estimating complexity degrees is configured so as to predict complexity degrees for each picture type.

10. The image coding device according to claim 1, wherein, in coding said images input by use of an image coding technique using a Group of Pictures (GOP), said constant interval is a multiple of N (Integer) of an interval length of said GOP.

11. A moving image coding device that makes a compression and coding for moving images, said image coding device comprising:

means for analyzing images, which exist in a first constant interval, to observe characteristics of each image;

based on said observed characteristics, means for estimating complexity degrees of said images;

means for predicting said complexity degrees of said images that exist in a second constant interval that succeeds said first constant interval;

means for allocating a code quantity to a combined interval in which said first constant interval and said second constant interval are combined, based on said estimated complexity degrees and said predicted complexity degrees, to compute a target code quantity with which said allocated code quantity is assigned to each image for all images within said combined interval;

a buffer which is accumulates a code that is generated as a result of having coded said images;

when said computed target code quantity is assigned to each of said images, means for predicting a transition of occupancy in said buffer of said accumulated code with said computed target code quantity and regulating said target code quantity so that the predicted transition of the buffer occupancy does not give rise to an overflow or an underflow; and means for making a compression and coding for said images according to said regulated target code quantity.

12. The image coding device according to claim 11, wherein said means for estimating complexity degrees of said images is configured so as to estimate complexity degrees of said images, based on statistics of said analyzed images.

13. The image coding device according to claim 11, wherein said means for predicting said complexity degrees of said images is configured so as to predict complexity degrees of said images, based on said complexity degrees of said images that were already analyzed.

14. The image coding device according to claim 11, wherein, in coding said images, which were input, with a predetermined coding method, said means for analyzing is configured so as to observe said code quantity, which are generated in coding said images and a value of a quantization scale used.

15. The image coding device according to claim 11, wherein said means for analyzing is configured so that in an event of making an intra-frame coding for said images that were input, a correlation is observed between neighboring pixels within a frame of said images; and in an event of making an inter-frame predictive coding for said images that were input, inter-frame prediction error quantity of said images that were input is observed.

16. The image coding device according to claim 11, further comprising means for reducing the size of said images that were input; and wherein, said means for analyzing is configured so that in an event of making an intra-frame coding for said images that were input, a correlation is observed between neighboring pixels within a frame of said images that were input; and in an event of making an inter-frame predictive coding for said images that were input, inter-frame prediction error quantity of said size reduced images is observed.

17. The image coding device according to claim 11, further comprising means for reducing the size of said images that were input, and wherein said means for analyzing is configured so that in an event of making an intra-frame coding for said images that were input, a correlation is observed between neighboring pixels within a frame of said reduced images; and in an event of making an inter-frame predictive coding for said images that were input, inter-frame prediction error quantity of said images that were input is observed.

18. The image coding device according to claim 11, wherein said moving image coding device includes means for reducing the size of said images that were input, and wherein said means for analyzing is configured so that in an event of making an intra-frame coding for said images that were input, a correlation is observed between neighboring pixels within a frame of said reduced images; and in an event of making an inter-frame predictive coding for said images that were input, inter-frame prediction error quantity of said size reduced images is observed.

19. The image coding device according to claim 11, wherein said means for predicting complexity degrees is configured so as to predict complexity degrees for each picture type.

20. The image coding device according to claim 11, wherein, in coding said images input by use of an image coding technique using a Group of Pictures (GOP), said combined interval is a multiple of N (Integer) of an interval length of said GOP.

21. A moving image coding method of making a compression and coding for moving images, employing a device having a buffer which accumulates a code, said image coding method comprising steps of:

analyzing images which exist in a constant interval, to observe characteristics of each image;

based on said observed characteristics, estimating complexity degrees of said images;

pre-allocating code quantity to said constant interval, and computing target code quantity with which said pre-allocated code quantity is assigned to each image for all images within said constant interval based on said estimated complexity degrees;

when said computed target code quantity is assigned to each of said images, predicting a transition of occupancy in said buffer of said accumulated code with said computed target code quantity and regulating said target code quantity so that the predicted transition of the buffer occupancy does not give rise to an overflow or an underflow; and making a compression and coding for said images according to said regulated target code quantity.

22. The image coding method according to claim 21, wherein in said step of estimating said complexity degrees of said images said complexity degrees of said images are estimated, based on statistics of analyzed images.

23. The image coding method according to claim 21, wherein in said step of estimating said complexity degrees of said images said complexity degrees of said images are estimated, based on said complexity degrees of said images that were already analyzed.

24. The image coding method according to claim 21, wherein, when said images that were input are coded with a predetermined coding method, in said step of analyzing images, said code quantity is observed, which is generated in coding and also observed is a value of a quantization scale used.

25. The image coding method according to claim 21, wherein, in said step of analyzing images, in an event of making an intra-frame coding for images that were input, a correlation is observed between neighboring pixels within a frame of said images, and in an event of making an inter-frame predictive coding for images that were input, inter frame prediction error quantity of said images that were input is observed.

26. The image coding method according to claim 21, wherein said moving image coding method further includes a step of reducing the size of said images that were input, and wherein, in said step of estimating said complexity degrees, in an event of making an intra-frame coding for said images that were input, a correlation is observed between neighboring pixels within a frame of said images that were input, and in an event of making an inter-frame predictive coding for said images that were input, inter-frame prediction error quantity of said size reduced images is observed.

27. The image coding method according to claim 21, wherein said moving image coding method further includes a step of reducing the size of said images that were input, and wherein, in said step of estimating said complexity degrees, in an event of making an intra-frame coding for said images that were input, a correlation is observed between neighboring pixels within a frame of said reduced images, and in an event of making an inter-frame predictive coding for said images that were input, inter-frame prediction error quantity of said images that were input is observed.

28. The image coding method according to claim 21, wherein said moving image coding method further includes a step of reducing the size of said images that were input, and wherein, in said step of estimating said complexity degrees, in an event of making an intra-frame coding for said images that were input, a correlation is observed between neighboring pixels within a frame of said reduced images, and in an event of making an inter-frame predictive coding for said images that were input, inter-frame prediction error quantity of said size reduced images is observed.

29. The image coding method according to claim 21, wherein in said step of estimating said complexity degrees predict complexity degrees for each picture type.

30. The image coding method according to claim 21, wherein, in coding said images input by use of an image coding technique using a Group of Pictures (GOP), said constant interval fixes an interval length of a GOP, and is a multiple of N (Integer) of said interval length of said GOP.

31. A moving image coding method of making a compression and coding for moving images, employing a device having a buffer which accumulates a code, said image coding method comprising steps of:

analyzing images, which exist in a first constant interval, to observe characteristics of each image;

based on said observed characteristics, estimating complexity degrees of said images;

predicting complexity degrees of said images that exist in a second constant interval that succeeds said first constant interval;

allocating a code quantity to a combined interval in which said first constant interval and said second constant interval are combined, based on said estimated complexity degrees and said predicted complexity degrees, to compute a target code quantity with which said allocated code quantity is assigned to each image for all images within said combined interval;

when said computed target code quantity is assigned, predicting a transition of occupancy in said buffer of said accumulated code with said computed target code quantity and regulating for each of images said target code quantity so that the predicted transition of the buffer occupancy does not give code quantity so that said buffer does not give rise to an overflow or an underflow; and making a compression and coding for said images according to said regulated target code quantity.

32. The image coding method according to claim 31, wherein in said step of estimating said complexity degrees of said images, said complexity degrees of said images are estimated, based on statistics of analyzed images.

33. The image coding method according to claim 31, wherein in said step of estimating said complexity degrees of said images, said complexity degrees of said images are predicted, based on said complexity degrees of said images that were already analyzed.

34. The image coding method according to claim 31, wherein, when said images that were input are coded with a predetermined coding method, in said step of analyzing images, said code quantity, is observed, is generated in coding and also observed is a value of a quantization scale used.

35. The image coding method according to claim 31, wherein, in said step of analyzing images to observe characteristics of each image, in an event of making an intra-frame coding for images that were input, a correlation is observed between neighboring pixels within a frame of said images, and in an event of making an inter-frame predictive coding for images that were input, inter-frame prediction error quantity of said images that were input is observed.

36. The image coding method according to claim 31, wherein said moving image coding method further includes a step of reducing the size of said images that were input, and wherein, in said step of estimating said complexity degrees, in an event of making an intra-frame coding for said images that were input, a correlation is observed between neighboring pixels within a frame of said images that were input, and in an event of making an inter-frame predictive coding for said images that were input, inter-frame prediction error quantity of said size reduced images is observed.

37. The image coding method according to claim 31, wherein said moving image coding method further includes a step of reducing the size of said images that were input, and wherein, in said step of estimating said complexity degrees, in an event of making an intra-frame coding for said images that were input, a correlation observed between neighboring pixels within a frame of said reduced images, and in an event of making an inter-frame predictive coding for said images that were input, inter-frame prediction error quantity of said images that were input is observed.

38. The image coding method according to claim 31, wherein said moving image coding method further includes a step of reducing the size of said images that were input, and wherein, in said step of estimating said complexity degrees, in an event of making an intra-frame coding for said images that were input, a correlation is observed between neighboring pixels within a frame of said reduced images, and in an event of making an inter-frame predictive coding for said images that were input, inter-frame prediction error quantity of said size reduced images is observed.

39. The image coding method according to claim 31, wherein in said step of estimating said complexity degrees predicts complexity degrees for each picture type.

40. The image coding method according to claim 31, wherein, in coding said images input by use of an image coding technique using a Group of Pictures (GOP), said combined interval fixes an interval length of a GOP, and is a multiple of N (Integer) of said interval length of said GOP.

41. A program for causing an information processing device, which configures a moving image coding device that makes a compression and coding for moving images, to execute processes of:

analyzing images, which exist in a constant interval, to observe characteristics of each image;

based on said observed characteristics, estimating complexity degrees of said images;

pre-allocating code quantity to said constant interval, and computing target code quantity with which said pre-allocated code quantity is assigned to each image for all images within said constant interval based on said estimated complexity degrees;

when said computed target code quantity is assigned to each of said images, predicting a transition of occupancy of a code accumulated in a buffer with said computed target code quantity and regulating said target code quantity so that said buffer does not give rise to an overflow or an underflow; and making a compression and coding for said images according to said regulated target code quantity.

42. A program for causing an information processing device, which configures a moving image coding device that makes a compression and coding for moving images, to execute processes of:

analyzing images, which exist in a first constant interval, to observe characteristics of each image;

based on said observed characteristics, estimating complexity degrees of said images;

predicting complexity degrees of said images that exist in a second constant interval that succeeds said first constant interval;

allocating a code quantity to a combined interval in which said first constant interval and said second constant interval were combined, based on said estimated complexity degrees and said predicted complexity degrees, to compute a target quantity with which said allocated code quantity is assigned to each image for all images within said combined interval;

when said computed target code quantity is assigned to each of said images, predicting a transition of occupancy of a code accumulated in a buffer with said computed target code quantity and regulating said target code quantity so that said buffer does not give rise to an overflow or an underflow; and making a compression and coding for said images according to said regulated target code quantity.

* * * * *